United States Patent
Morooka

(10) Patent No.: US 6,201,553 B1
(45) Date of Patent: Mar. 13, 2001

(54) CHARACTER GENERATING METHOD AND APPARATUS

(75) Inventor: Hidekazu Morooka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/947,901

(22) Filed: Oct. 9, 1997

(30) Foreign Application Priority Data

Oct. 24, 1996 (JP) .................................................. 8-282461

(51) Int. Cl.$^7$ ................................................. G06T 11/00
(52) U.S. Cl. ......................... 345/470; 345/468; 345/469; 345/471; 345/472
(58) Field of Search ..................................... 345/467, 468, 345/469, 470, 471, 472, 441, 443, 126

(56) References Cited

U.S. PATENT DOCUMENTS

| | | | |
|---|---|---|---|
| 4,298,945 | * 11/1981 | Kyte et al. | 345/469 |
| 4,674,058 | * 6/1987 | Lindbloom et al. | 345/441 |
| 4,703,515 | * 10/1987 | Baroody, Jr. | 345/126 |
| 5,293,472 | * 3/1994 | Lotspiech | 345/443 |
| 5,493,640 | * 2/1996 | Itoh et al. | 345/441 |
| 5,727,140 | * 3/1998 | Ohtomo et al. | 345/467 |
| 5,734,748 | * 3/1998 | Amano | 345/467 |

* cited by examiner

Primary Examiner—Mark K. Zimmerman
Assistant Examiner—Kimbinh T. Nguyen
(74) Attorney, Agent, or Firm—Fitzpatrick, Cella, Harper & Scinto

(57) ABSTRACT

When a character image composed of strokes is generated, character generation is performed at high speed by simplifying strokes for which the processing of the stroke contours can be executed in simple fashion. In other words, if a stroke has a substantially linear shape parallel to a coordinate axis, the contour of the stroke will have sides parallel to the coordinate axis and can therefore be generated in a simple manner. In another aspect of the invention, character generation is performed at high speed by generating the image of a stroke in such a manner that dots of the stroke in the longitudinal direction thereof are stored at memory locations having successive addresses. That is, memory cells having successive addresses usually are allocated along the direction of the scanning lines. Accordingly, when necessary a stroke is rotated in such a manner that the longitudinal direction thereof becomes parallel to the raster lines, thereby producing a stroke. As a result, the number of black clusters can be reduced and characters can be generated at higher speed.

30 Claims, 19 Drawing Sheets

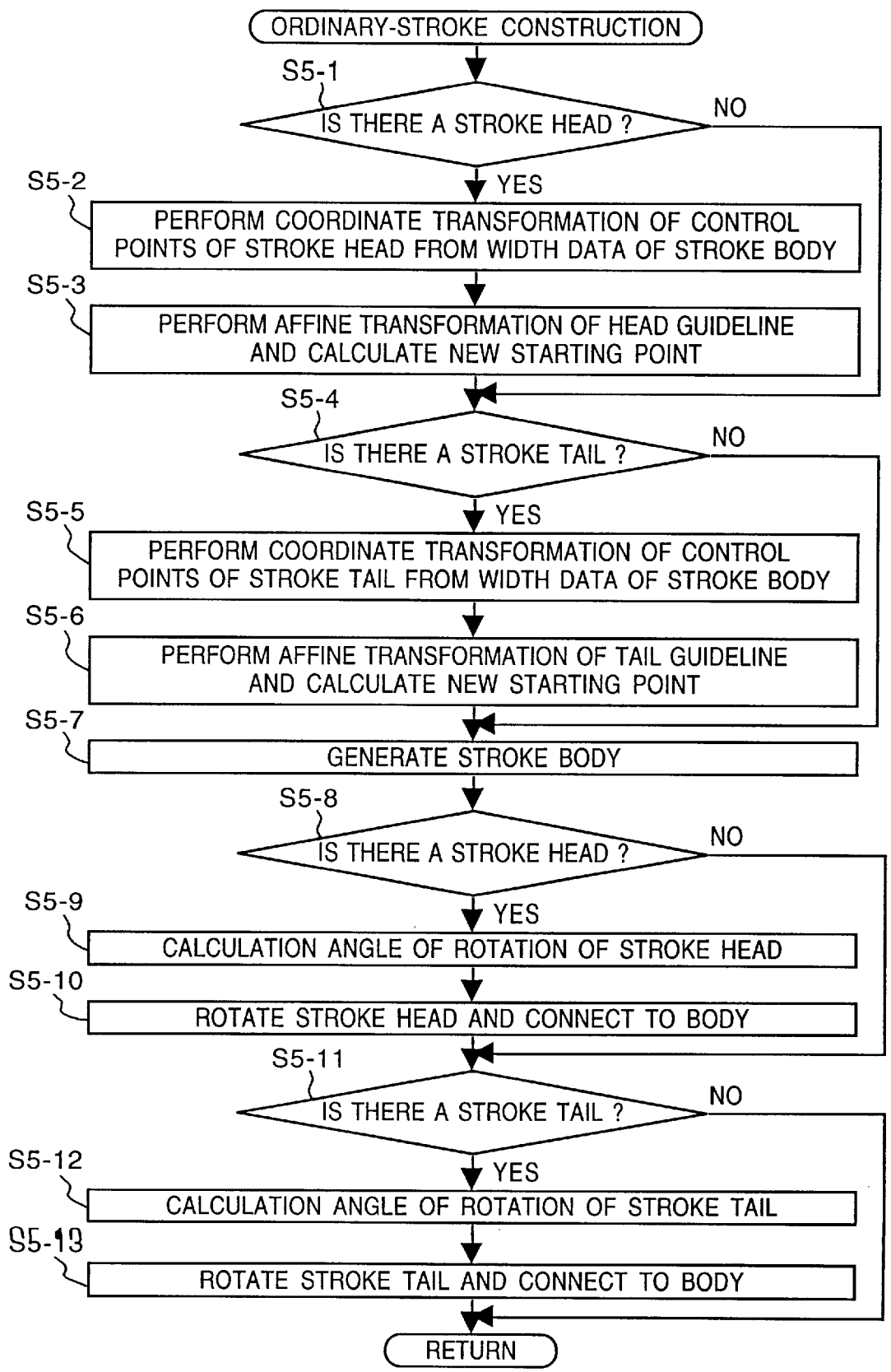

CONNECTION OPENING IS
HORIZONTAL PATTERN

CONNECTION OPENING IS
VERTICAL PATTERN $$\cos\theta = \frac{\vec{A}\cdot\vec{B}}{|\vec{A}|\cdot|\vec{B}|} \implies$$

CHARACTER GENERATING METHOD AND APPARATUS

BACKGROUND OF THE INVENTION

1. Field of the Invention

This invention relates to a character generating method and apparatus for reconstructing e.g. a character pattern or the like by combining the elements of the character.

2. Description of the Related Art

In order to reduce the quantity of font data in character generation, the practice in the prior art is to use a font scheme based upon the combining of strokes in which a font is stored in memory upon first being broken down into character elements (referred to as "strokes" below) each composed of a stroke body, after which the strokes are read out of memory and combined to generate the character. In the character generating process of this scheme, strokes constituting the character are constructed, stroke scaling or the like is performed as necessary, and the strokes are placed, as the elements constituting the character, at positions given for each character, whereby the character is eventually obtained.

In the font scheme based upon the combining of strokes, however, about 30% of total processing time required for character generation is taken up by stroke construction processing. Consequently, in comparison with outline font processing in which a character pattern is generated from data representing the entire contour of a character, the font scheme based upon the combining of strokes involves a character pattern development time that is prolonged by the length of time necessary for stroke construction processing.

SUMMARY OF THE INVENTION

Accordingly, an object of the present invention is to provide a character processing method and apparatus through which the time required for character generation can be shortened by shortening stroke construction processing time.

Another object of the present invention is to provide a character generating method for generating a character image by combining strokes, comprising: a determination step of determining, based upon stroke data representing a stroke which constitutes a character, whether the stroke is a simple stroke, for which computation for contour generation is simple, or an ordinary stroke, for which computation for contour generation is complex; a stroke generating step of generating the contours of strokes through a procedure conforming to results of the determination; and a character generating step of generating a character image by combining the stroke contours generated at the stroke generating step.

Another object of the present invention is to provide a character generating method for generating a raster image of a character by combining strokes, comprising: a stroke generating step of generating a raster image of a stroke of interest in such a manner that pixels of a row of successive pixels extending longitudinally of the stroke are stored at memory locations having successive addresses, and a character generating step of generating a character image by combining strokes generated at the stroke generating step.

Another object of the present invention is to provide a character generating apparatus for generating a character image by combining strokes, comprising: determination means for determining, based upon stroke data representing a stroke which constitutes a character, whether the stroke is a simple stroke, for which computation for contour generation is simple, or an ordinary stroke, for which computation for contour generation is complex; stroke generating means for generating the contours of strokes by a procedure conforming to results of the determination; and character generating means for generating a character image by combining the stroke contours generated by the stroke generating means.

Another object of the present invention is to provide a character generating apparatus for generating a raster image of a character by combining strokes, comprising: stroke generating means for generating a raster image of a stroke of interest in such a manner that pixels of a row of successive pixels extending longitudinally of the stroke are stored at memory locations having successive addresses, and character generating means for generating a character image by combining strokes generated by the stroke generating means.

Another object of the present invention is to provide a computer readable memory storing a character generating program for generating a character image by combining strokes, the program having: determination means for determining, based upon stroke data representing a stroke which constitutes a character, whether the stroke is a simple stroke, for which computation for contour generation is simple, or an ordinary stroke, for which computation for contour generation is complex; stroke generating means for generating the contours of strokes through a procedure conforming to results of the determination; and character generating means for generating a character image by combining the stroke contours generated by the stroke generating means.

Another object of the present invention is to provide a computer readable memory storing a character generating program for generating a raster image of a character by combining strokes, the program having: stroke generating means for generating a raster image of a stroke of interest in such a manner that pixels of a row of successive pixels extending longitudinally of the stroke are stored at memory locations having successive addresses, and character generating means for generating a character image by combining strokes generated by the stroke generating means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 9 is a flowchart illustrating processing for constructing an ordinary stroke;

DESCRIPTION OF THE PREFERRED EMBODIMENTS

[First Embodiment]

Figure 1:
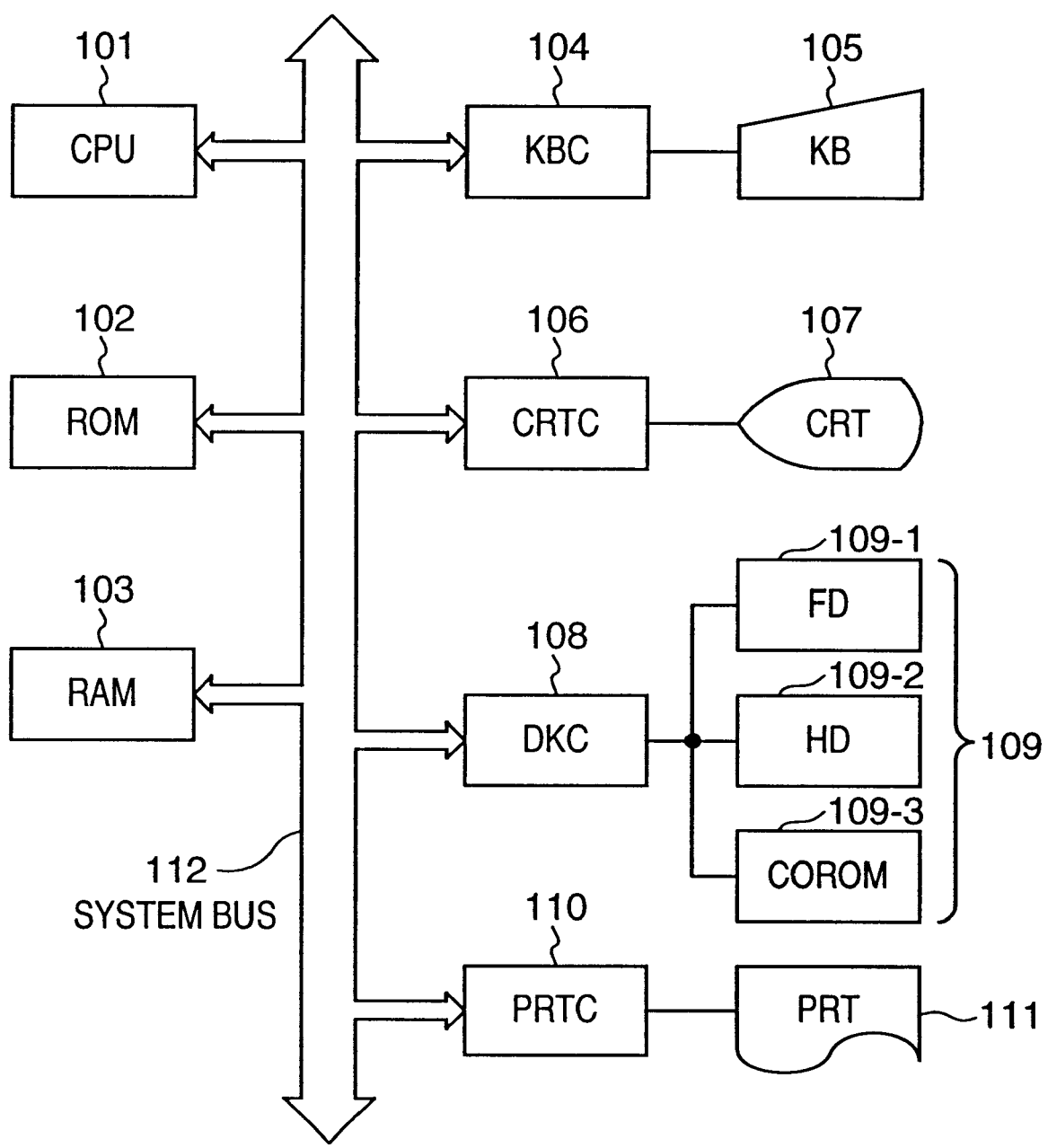
FIG. 1 is a block diagram illustrating the configuration of a system according to a first embodiment of the present invention.

FIG. 1 is a block diagram illustrating the basic configuration of an information processing system to which the present invention is applied. This system may be a Japanese word processor, work station or personal computer, etc. In FIG. 1, a central processing unit (CPU) 101 performs overall control of the system and executes processing, etc. A read-only memory (ROM) 102 stores a system start-up program, character pattern data for character conversions, etc. A random-access memory (RAM) 103 temporarily stores a program (described later) executed by the CPU 101, data used when this program is executed, results of processing by the CPU 101, etc. A keyboard controller (KBC) 104 accepts data (character codes and control codes) entered by pressing keys on a keyboard (KB) 105 and sends the data to the CPU 101. A display controller (CRTC) 106 reads out display information that has been stored in the RAM 103, namely a bitmap image obtained by conversion from a character code, and transfers the bitmap image to a display unit (CRT) 107. The latter accepts the bitmap image from the CRTC 106 and displays the bitmap image on a display screen. A disk controller (DKC) 108 controls the transmission of data to an external storage unit 109. The latter includes a floppy disk device (FD) 109-1 and a hard disk device (HD) 109-1 or CD-ROM 109-3. Programs and data are stored in the external storage unit 109 in advance. The CPU 101 refers to the stored data or loads the data into the RAM 103 as necessary. A printer controller (PRTC) 110 controls the operation of a printer (PRT) 111. A system bus 112 is used for the transfer of data among the components set forth above.

Figure 12:
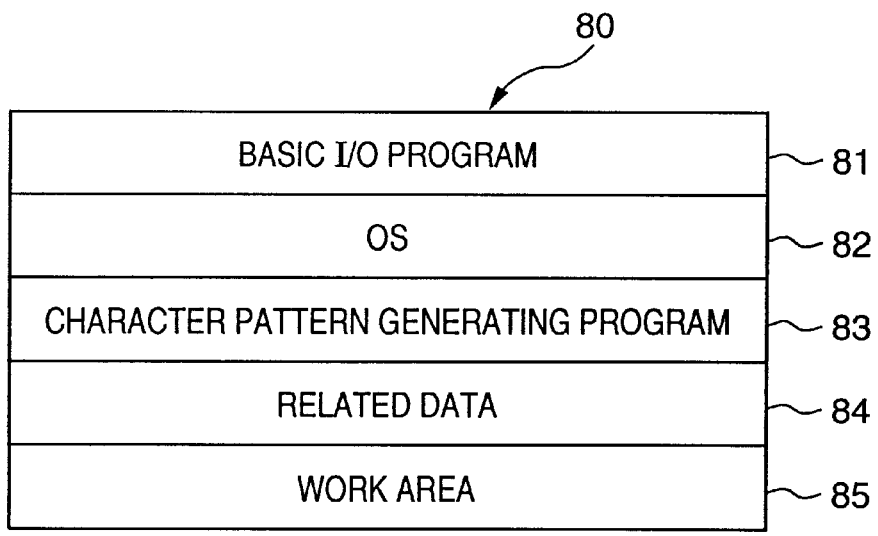
FIG. 12 is a diagram showing the construction of a memory according to the first through third embodiments.

FIG. 12 is a diagram showing a memory map in the RAM 103 when character generating processing according to the present invention is executed by the system shown in FIG. 1. This system is operated by having the CPU 101 execute a basic input/output (I/O) program 81, an operating system (OS) 82 such as the Windows system and a character pattern generating program 83, which generates character patterns, or an application that utilizes this program. The basic I/O program 81 is stored in the ROM 102 shown in FIG. 1, and the operating system 82 is stored on the hard disk (HD) 109-2. When the power supply has been turned on, the operating system 82 is read into the RAM 103 from the hard disk 109-2 by an IPL (initializing program loading) function provided in the basic I/O program 81. Operation then starts.

Figure 13:
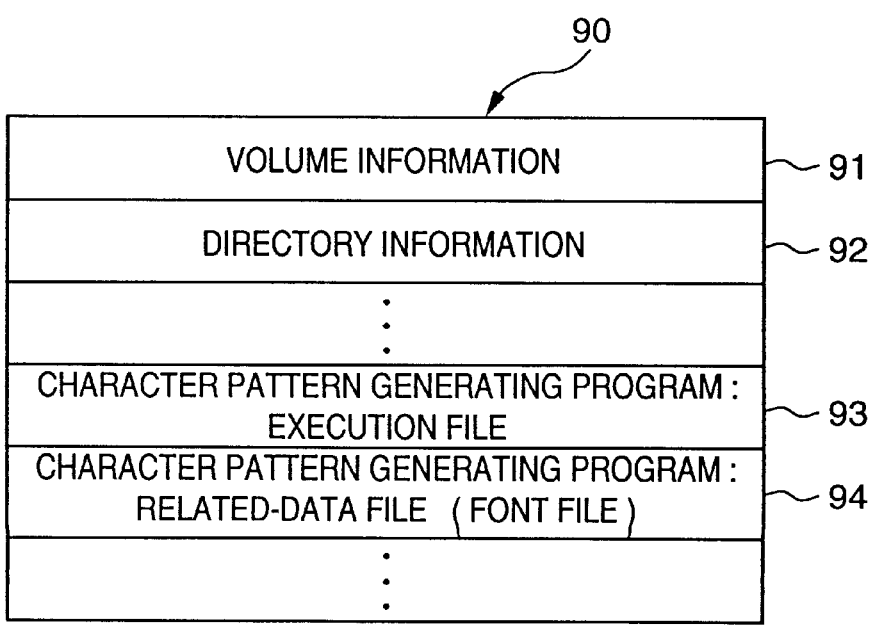
FIG. 13 is a diagram showing the organization of content on a medium such as a floppy disk or CD-ROM on which a program according to the first through third embodiments has been recorded.
Figure 14:
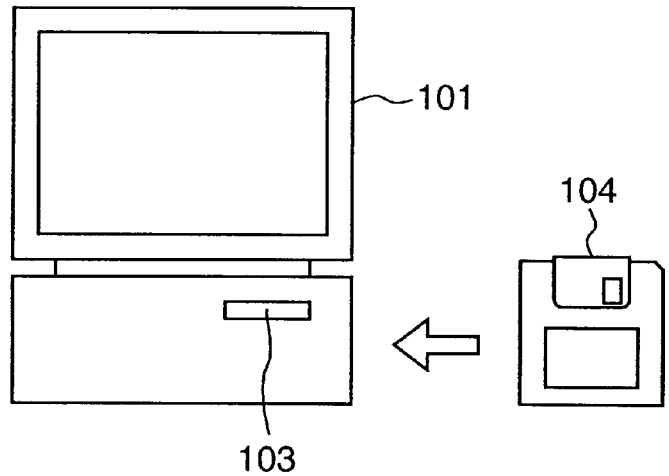
FIG. 14 is a conceptual view showing a program being supplied by a medium such as a floppy disk or CD-ROM on which the program according to the first through third embodiments has been recorded.

The programs and related data in this embodiment are supplied by the FD 109-1 or CD-ROM 109-3 in FIG. 1. FIG. 13 illustrates the structure of a file that has been stored in the FD 109-1 or CD-ROM 109-3. By installing a program file and a related-data file, which have been read out of the FD 109-1 or CD-ROM 109-3, in the HD 109-2, it is possible for the files to be loaded from the HD 109-2 to the RAM 103 and for the program to be executed by the CPU 101. Alternatively, it is possible for the files to be loaded directly from the FD or CD-ROM to the RAM 103, after which the program would be executed.

Figure 5:
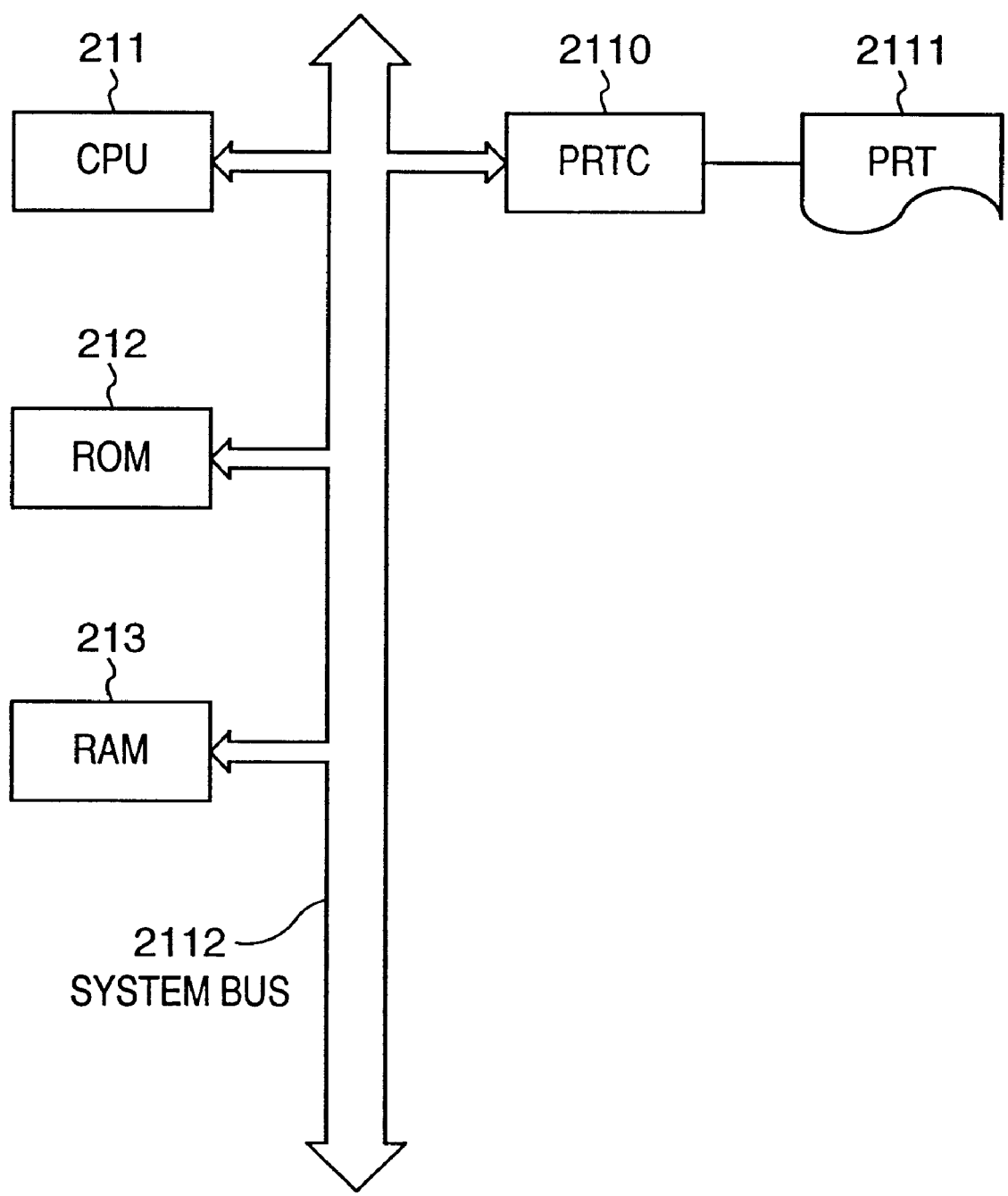
FIG. 5 is a block diagram illustrating the configuration of another system according to the first embodiment.

FIG. 5 is a block diagram showing the control configuration of a second system to which a character processing apparatus according to the present invention is capable of being applied. In FIG. 5, a printer 2111 may be a laser printer, an ink-jet printer or a thermal transfer printer, etc. A CPU 211 performs overall control of the system and executes processing, etc. A ROM 212 stores a system start-up program, character pattern data, etc. A RAM 213 is a data storage area for unrestricted use. Various programs and data are loaded here depending upon the type of processing so that the programs can be executed. A printer controller 2110 controls a printer 2111. A system bus 2112 provides a path for data flowing among the components mentioned above.

The arrangement shown in FIG. 5 may be used instead of that shown in FIG. 1. However, since the arrangement of FIG. 5 is not equipped with an external storage unit for storing files, programs, font data and the like are stored in the ROM 212. In such case the memory map would be the same as that shown in FIG. 12 with the exception of the data.

The operation of this embodiment constructed as set forth above will now be described with reference to the flowcharts of FIGS. 6 through 9 and the diagrams of FIGS. 2 through 4.

Figure 2:
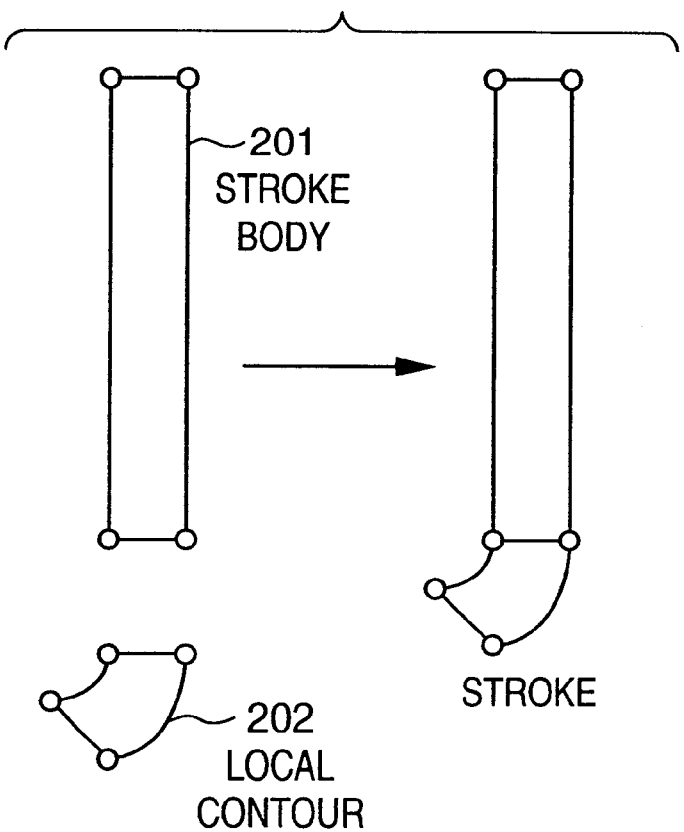
FIG. 2 is a diagram for stipulating stroke body data and local contour (head or tail) data.
Figure 3:
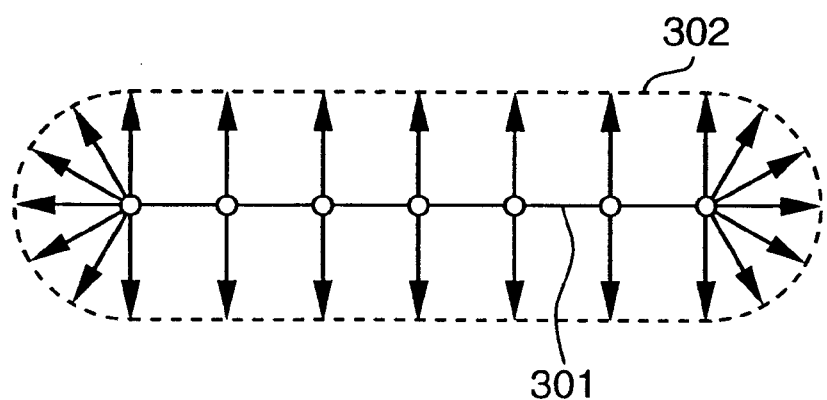
FIG. 3 is a diagram useful in describing stroke data.

FIG. 2 illustrates an example of the manner in which a character is generated by a font scheme based upon the combining of strokes. According to this method, a character is broken down into its strokes and each stroke is stored, in a vector format, as a combination of a stroke body 201, which is a horizontal or vertical bar constituting the framework of the character, and a local contour (a stroke head or a stroke tail) 202 connected to the starting point or end point of the stroke body 201. The stroke is formed by combining the stroke body and the stroke head or tail, and the character is constructed by combining strokes thus formed. It is also possible to form a stroke solely of a stroke body. The data stipulating the shape of a stroke is as shown in FIG. 3. Specifically, the skeleton of the stroke is represented by a straight line 301, and the contour 302 is expressed by distance from the skeleton (i.e., by skeleton+width). Each stroke possesses width information (also referred to as "weight information" below). Further, each stroke is assigned a stroke ID. Stroke combination information has one-to-one correspondence with each character code. Stored in the stroke combination information are the stroke IDs and stroke placement information for synthesizing the character. Strokes are combined using this information. To create the stroke combination information, the strokes to be combined are decided in advance in dependence upon the style of type, the character code, character side and weight information. These strokes create the stroke combination information.

FIG. 4B is a diagram illustrating an example of stroke combination information relating to a character pattern shown in FIG. 4A. STROKE_COUNT indicates the number of strokes that make up the character pattern, and stroke ID indicates the identifiers of the strokes used in the character. It will be understood that the character shown in FIG. 4A is composed of three strokes whose stroke IDs are 1, 2 and 3. Stroke placement coordinates indicate coordinates STROKE_ST and STROKE_END at both ends of the skeleton of each stroke in the character design coordinate system (a maximum of 800×800 dots in this embodiment). Stroke weight indicates width information for each stroke.

The coordinate system used in character pattern generation will now be described. First, the stroke placement information indicates the placement of strokes in a case where a character pattern is generated using 800×800 dots. The 800×800 dot coordinate system is referred to as the character design coordinate system. The data representing each stroke and the control points of the local contour of each stroke are defined in a stroke design coordinate system. Scale in the stroke design coordinate system is equal to that in the character design coordinate system. More specifically, a stroke defined in the stroke design coordinate system can be utilized in the character design coordinate system without scaling. However, the origin of the coordinate system is defined in dependence upon the size of the defined stroke or the size of the local contour. Further, the character pattern finally output is generated in a character output coordinate system, which conforms to the output size.

Stroke data that has been stored in the ROM 102 or external storage unit 109 is retrieved and read out based upon the stroke ID. The stroke data includes D_STROKE_SIZE, which is the size of each stroke in the stroke design coordinate system, weight information D_STROKE_WEIGHT, control point data D_STROKE_POINT[ ], and head data H_ID and tail data T_ID indicative of the local contours connected to the stroke. Data indicated by the ID of the local contour is a control-point data string of the local contour in the stroke design coordinate system. Further, the head data H_ID and tail data T_ID of local contours are read out of the stroke data when the stroke combination information is created and these items of data are added on as part of the stroke combination information.

FIGS. 6 through 9 are flowcharts indicating the basic operating procedure of the system according to this embodiment. These flowcharts illustrate the procedure of the character pattern generating program 83. The CPU 101 executes processing and generates characters in accordance with the procedure of these flowcharts.

Figure 6:
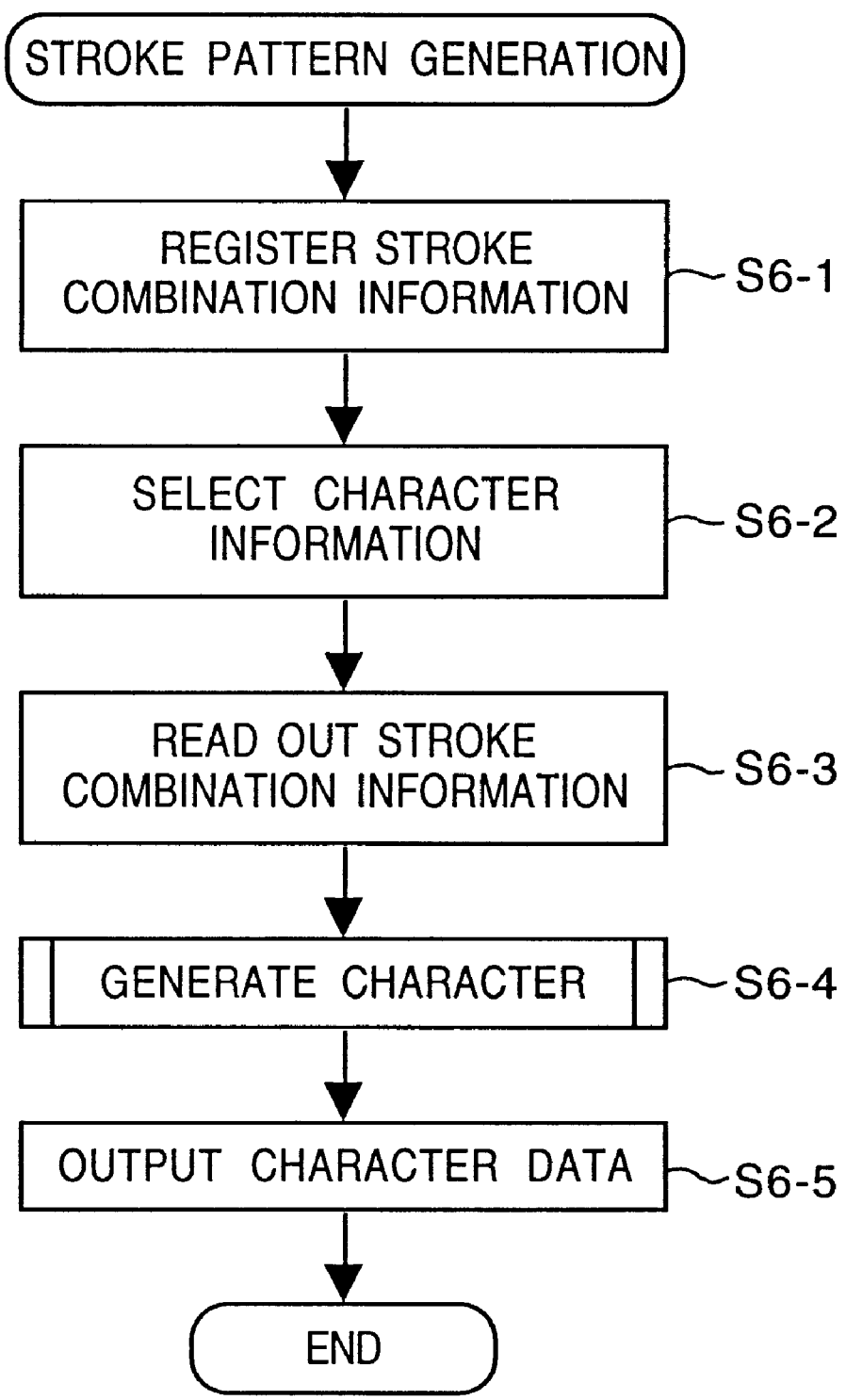
FIG. 6 is a flowchart illustrating a character pattern generating procedure in the system according to first through third embodiments.

In conformity with font files to be used, stroke combination information is read out of a plurality of font files installed in the system and the information is stored in the RAM 103 at step S6-1 in FIG. 6. The stroke combination information to be read out is decided based upon the style of type, character code, character size and weight information at step S6-2. Next, at step S6-3, the stroke combination information is read from the stroke combination information that was stored in the RAM 103. This is followed by step S6-4, at which a character is generated based upon the stroke information and the data representing this character is set in an output buffer. The character data generated is output at step S6-5.

Figure 7:
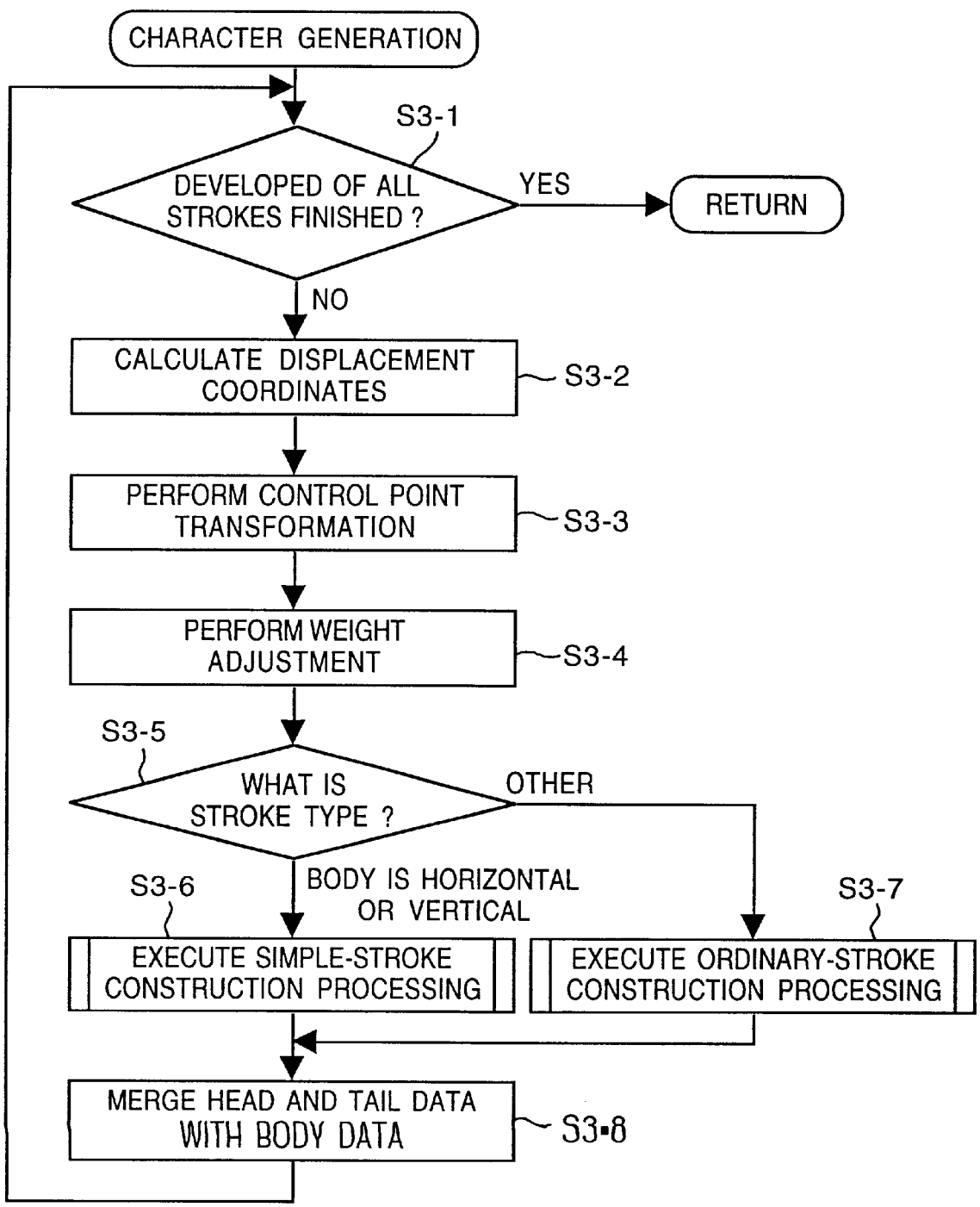
FIG. 7 is a flowchart illustrating character generation processing according to the first embodiment.

FIG. 7 is a flowchart illustrating the character generating processing of step S6-4 in FIG. 6.

At step S3-1, the number of strokes whose development has been completed is compared with the stroke count STROKE_COUNT representing the number of strokes constituting the character being created. If the two do not agree, this means that the development of all strokes is not finished; hence, the program proceeds to step S3-2. If the two agree, this means that character generation is finished and, hence, the program returns to step S6-5 in FIG. 6.

Step S3-2 is processing for calculating placement coordinates. In regard to a stroke of interest, the stroke placement coordinates O_STROKE_ST, O-STROKE-EN in the character output coordinate system are obtained in the following manner from the placement coordinates of the stroke in the character design coordinate system:

$$O\text{-STROKE\_}ST=\text{STROKE\_}ST\times(\text{OUT\_SIZE}/800)$$

$$O\text{-STROKE\_}EN=\text{STROKE\_}EN\times(\text{OUT\_SIZE}/800)$$

where (OUT_SIZE/800) represents the maximum character size in the character output coordinate system.

Step S3-3 is processing for coordinate transformation of the control point data. Specifically, a coordinate transformation is made from the character design coordinate system to the character output coordinate system. By virtue of this transformation, a stroke defined by control points is scaled in conformity with the size in the character output coordinate system.

The ratio of the character output coordinate system to the character design coordinate system is obtained in accordance with the equation $$\text{Stroke\_Ratio}=abs(O\_\text{STROKE\_}ST-O\_\text{STROKE\_}EN)/abs(D\_\text{STROKE\_}ST-D\_\text{STROKE\_}EN)$$

It should be noted that D_STROKE_ST and D_STROKE_EN respectively represent the starting and end points of the stroke of interest in the stroke design coordinate system. Furthermore, the control point data of the stroke of interest is transformed to data in the output coordinate system by $$\text{Stroke\_Ratio}\times D\_{STROKE}\_\text{POINT}[\ ]$$

where D_STROKE_POINT[ ] is a control point, which defines a Bézier curve or the like included in the stroke, in the stroke design coordinate system of the stroke of interest. The coordinates of the control point obtained is set as O_STROKE_POINT[ ].

Step S3-4 is processing for adjusting stroke weight information. Specifically, if we let O_Weight represent the weight of the character output coordinate system, a weight conversion ratio is obtained in accordance with the equation $$\text{Weight\_Ratio}=O\_\text{Weight}/D\_\text{STROKE\_Weight}$$

and O_STROKE_POINT[ ] is subjected to a weight adjustment in such a manner that the stroke weight will become O_Weight. Here stroke weight in the character output coordinate system is defined independently of Stroke_Weight. However, if the character is one of a standard size, Stroke_Ratio can be used as Weight_Ratio or Weight_Ratio can be calculated on the basis of Stroke_Ratio.

Step S3-5 is processing for judging stroke type. Specifically, the x, y coordinates of the starting point and x, y coordinates of the end point of the skeleton data representing the stroke are compared at step S3-5, whereby it is determined whether the stroke of interest is a simple stroke, namely one in which the body portion of the stroke has a substantially linear shape that is horizontal or vertical, or an ordinary stroke, namely one in which the body portion is an oblique line or is non-linear. In other words, strokes are divided into simple strokes and ordinary strokes. In the case of a simple stroke, conversion of the position or contour of a stroke can be performed by a simple computation, as by calculation performed independently for each coordinate component or by interchanging x and y components. In the case of an ordinary stroke, a complex computation in which coordinate components are interrelated is performed. Although ordinary strokes also include strokes having a body portion which is a curve, such strokes can be judged based upon the presence of control points which stipulate the contour of the stroke. Further, an identifier for identifying a stroke as a simple stroke or ordinary stroke can be stored beforehand as part of the stroke data in correlation with the stroke ID, and whether a stroke is simple or ordinary can be judged based upon the identifier.

If the result of the determination is that a stroke is a simple stroke, the program proceeds to step S3-6; otherwise, the program proceeds to step S3-7. Stroke construction processing conforming to the type of stroke is executed at steps S3-6 and S3-7.

Step S3-8 is processing for merging head data and tail data with the body data obtained by stroke construction processing.

Figure 8:
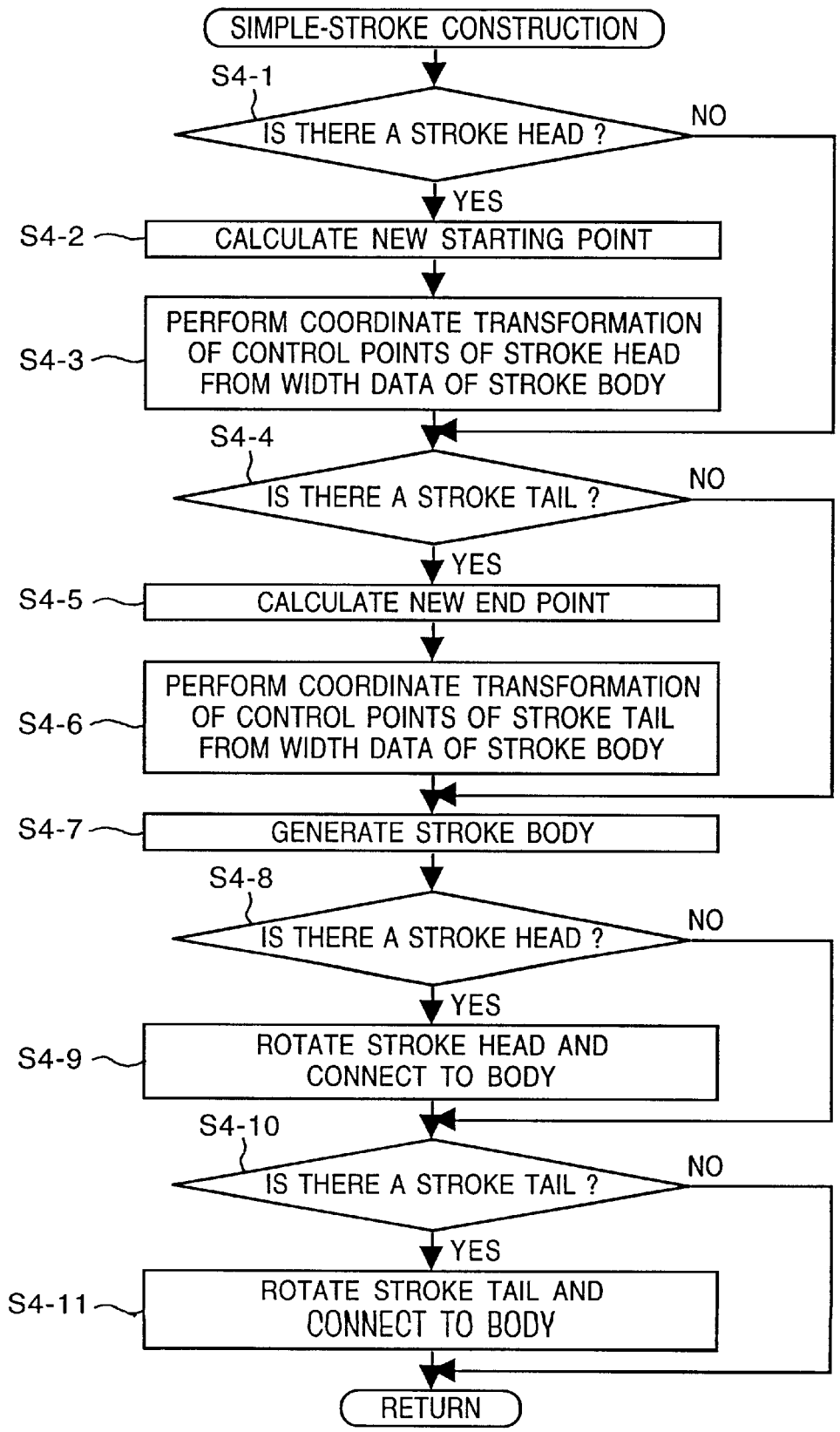
FIG. 8 is a flowchart illustrating processing for constructing a simple stroke.

FIG. 8 is a flowchart illustrating the procedure through which a simple stroke is generated. It is determined at step S4-1 whether a stroke head to be connected to a stroke body exists. The absence or presence of a stroke head is determined based upon the identifier H_ID of the stroke data. The program proceeds to step S4-2 if a head is present and to step S4-3 in the absence of a head.

Step S4-2 is processing for recalculating the starting point of the stroke in view of the size of the head in order to connect the head to the stroke body. In the case of a simple stroke, the starting point is recalculated in regard to either the direction along the x axis or the direction along the y axis. In other words, calculation is performed solely along the y axis if the stroke is a vertical stroke and solely along the x axis if the stroke is a horizontal stroke.

Figure 10A:
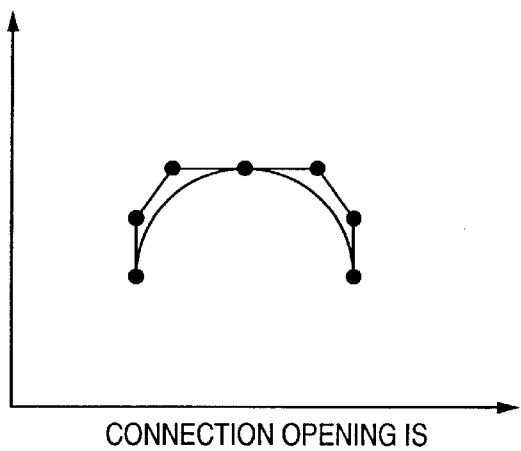
FIGS. 10A and 10B are diagrams showing the placement of head and tail data in a design coordinate system.
Figure 10B:
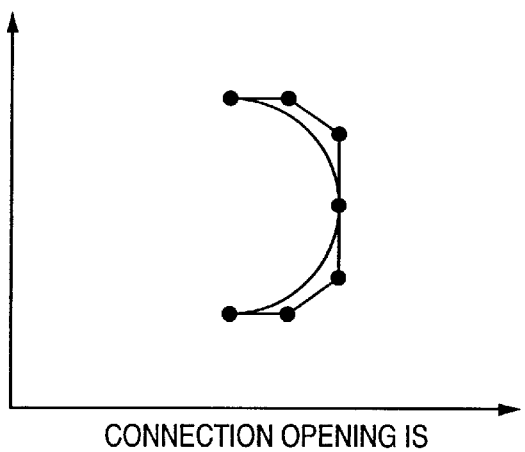

Step S4-3 is processing for subjecting a control point sequence of head data, which represents a head to be connected to the stroke body, to a coordinate transformation from the weight data of the stroke body portion, thereby scaling the stroke head. The weight conversion ratio of the head is obtained in accordance with the equation Head_Weight_Ratio=$O$_Weight/$D$_Head_Weight where O_Weight represents stroke weight in the character output coordinate system and D_Head_Weight represents the weight of the stroke head portion in the design coordinate system. The control point sequence O_HEAD_POINT[ ] is subjected to adjustment using this ratio in such a manner that the weight of the stroke head will become O_Weight. To achieve this, the control point sequence is multiplied by the above-mentioned ratio, by way of example. As shown in FIGS. 10A and 10B, the head and tail control point sequence is arranged in such a manner that the connection opening of the head or tail is rendered parallel to the horizontal or vertical direction with regard to the coordinate axes of the design coordinate system. This sequence is stored beforehand as data.

It is determined at step S4-4 whether a stroke tail to be connected to the stroke body exists. The absence or presence of a stroke tail is judged based upon the identifier T_ID of the stroke data. The program proceeds to step S4-5 if a stroke tail is present and to step S4-7 if a stroke data is absent. The end point of the stroke is recalculated at step S4-5 through a technique similar to that of step S4-2. Scaling of the stroke tail is performed at step S4-6 through a technique similar to that of step S4-3. The weight conversion ratio is obtained from the stroke weight O_Weight in the character output coordinate system and the weight D_Tail_Weight of the stroke tail in the character design coordinate system. The control point sequence O_Tail_POINT in the character output coordinate system is obtained using this ratio in such a manner that the weight of the stroke tail will become O_Weight. The essentials of the computations are similar to those set forth in step S4-3.

The stroke body is generated at step S4-7. Four points which constitute the stroke body are generated from the weight data, stroke starting point and stroke end point. For example, this step includes generating both ends of a line segment which is bisected by the stroke starting point and which perpendicularly intersects the skeleton connecting the starting and end points of the stroke, generating both ends of a line segment which is bisected by the stroke end point and which perpendicularly intersects the skeleton, and adopting the rectangle which has these four points as the corners as the stroke body. In the case of a simple stroke, the skeleton is parallel to the x axis or y axis and computation is very simple.

Step S4-8 is for determining whether a stroke head to be connected to the stroke body exists. The program proceeds to step S4-9 if the stroke head exists and to step S4-10 if the stroke head does not exist. The stroke head is connected to the stroke body at step S4-9. The stroke head is subjected to rotation in units of 90° in such a manner that the stroke head can be connected to the stroke body. If the connection opening of the stroke head has been rotated in a direction that will make it face the end portion of the stroke body, the stroke body and the head are connected together. That is, the coordinates of each of the control points of the stroke head are transformed in such a manner that the opening will be connected to the end of the stroke body in the output coordinate system.

Whether a stroke tail to be connected to the stroke body exists is determined at step S4-10. If the stroke tail exists, the program proceeds to step S4-11. If the stroke tail does not exist, the processing of FIG. 8 is terminated and the program returns to step S3-8 of FIG. 7. Step S4-11 is processing for connecting the stroke tail to the stroke body. The stroke tail is subjected to rotation in units of 90° in such a manner that the stroke tail can be connected to the stroke body. If the connection opening of the stroke tail has been rotated in a direction that will make it face the end portion of the stroke body, the stroke body and the tail are connected together. That is, the coordinates of each of the control points of the stroke tail are transformed in such a manner that the opening will be connected to the end of the stroke body in the output coordinate system.

FIG. 9 is a flowchart illustrating the procedure through which an ordinary stroke is generated. It is determined at step S5-1 whether a stroke head to be connected to a stroke body exists. The absence or presence of a stroke head is determined based upon the identifier H_ID of the stroke data. The program proceeds to step S5-2 if a head is present and to step S5-3 in the absence of a head.

Step S5-2 is processing for subjecting the control point sequence of the stroke head to a coordinate transformation from the weight data of the stroke body portion and scaling the stroke head. The weight conversion ratio of the head is obtained in accordance with the equation Head_Weight_Ratio=O_Weight/D_Head_Weight where O_Weight represents stroke weight in the character output coordinate system and D_Head_Weight represents the weight of the head portion in the design coordinate system. The control point sequence O_HEAD_POINT[ ] of the character output coordinate system is obtained in such a manner that the weight of the stroke head will become O_Weight.

The starting point of the stroke is recalculated at step S5-3 in order to connect the head. Specifically, in regard to the direction of the stroke skeleton, the size of the stroke head is calculated using an affine transformation and the calculated size is subtracted from the starting coordinates to recalculate the starting point.

It is determined at step S5-4 whether a stroke tail to be connected to the stroke body exists. The absence or presence of a stroke tail is judged based upon the identifier T_ID of the stroke data. The program proceeds to step S5-5 if a stroke tail is present and to step S5-7 if a stroke data is absent. Step S5-5 is processing for subjecting the tail data to a scale conversion through a technique similar to that of step S4-3. The weight conversion ratio is obtained from the stroke weight O_Weight in the character output coordinate system and the weight D_Tail_Weight of the stroke tail in the character design coordinate system. The control point O_Tail_POINT in the output coordinate system of the stroke tail is obtained by multiplying the control point coordinates by this ratio.

The end point of the stroke is recalculated at step S5-6 through technique similar to that used in step S5-3.

The stroke body is generated at step S5-7. The weight conversion ratio regarding the stroke body is obtained from weight data in the character output coordinate system and weight data in the character design coordinate system of the stroke body, the coordinates of the control points of the stroke body are transformed and the control points that construct the stroke body are generated in the output coordinate system.

Figure 11A:
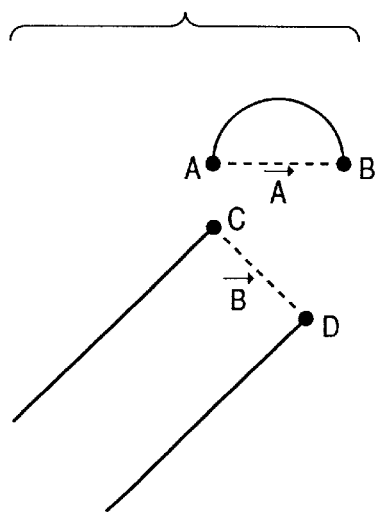
FIGS. 11A and 11B are diagrams showing an angle defined by a stroke body and head portion.
Figure 11B:
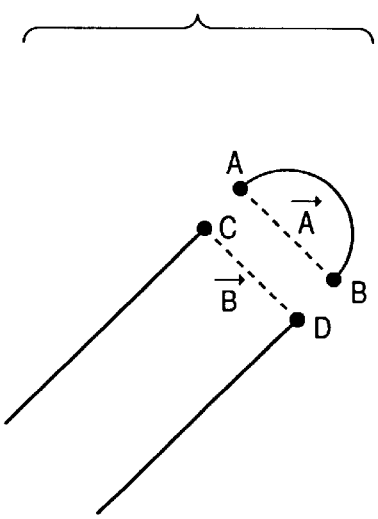

Step S5-8 is for determining whether a stroke head to be connected to the stroke body exists. The program proceeds to step S5-9 if the stroke head exists and to step S5-10 if the stroke head does not exist. Step S5-9 is processing for finding the angle of rotation of the stroke head that will make it possible to connect the stroke head to the stroke body. As shown in FIGS. 11A and 11B, an angle θ defined by a vector A connecting both end points A and B of the connecting portion of the stroke head and a vector B connected both end points of C and D of the connecting portion of the body is obtained in accordance with the equation $$\cos\theta = \frac{\vec{A}\cdot\vec{B}}{|\vec{A}|\cdot|\vec{B}|}$$

Next, at step S5-10, the control point data of the head is subjected to rotation processing using the rotation angle θ found, thereby effecting a conversion to data that makes possible the connection to the body.

Whether a stroke tail to be connected to the stroke body exists is determined at step S5-11. If the stroke tail exists, the program proceeds to step S5-12. If the stroke tail does not exist, the program proceeds to step S3-8 of FIG. 7. Step S5-9 is processing for finding the angle of rotation of the stroke tail that will make it possible to connect the control point data of the stroke tail to the stroke body. Here a rotation angle γ is obtained through a procedure the same as that used for the stroke head. Next, at step S5-13, the control point data of the tail is subjected to rotation processing using the rotation angle γ found, thereby effecting a conversion to data that makes possible the connection to the body.

By virtue of this procedure, a character pattern is generated from stroke data with regard to an ordinary stroke.

If each stroke constituting a character pattern is thus generated and placed in the character output coordinate system, the contour of the desired character will be obtained. In a case where this character pattern is output as an image, a dot image is produced on the basis of the character contour and the dot image is output by being displayed or printed.

In accordance with this embodiment, as described above, stroke construction processing is switched between a first case in which a stroke body is horizontal or vertical, i.e. oriented along one of the coordinate axes, and a second case in which the stroke body defines an angle other than 0° or 90° with respect to the coordinate axes or is a curve. In the first case, the starting points of a stroke head and stroke tail can be obtained without complicated calculation, and the rotation for connecting the body to the head and tail can be performed without complicated calculation. Accordingly, by switching the stroke construction processing, it is possible to greatly simplify processing depending upon the shape of the stroke. Characters having vertical or horizontal strokes are very numerous. Accordingly, switching processing between the first and second cases makes it possible to generate characters at high speed. This embodiment will be effective even if it is so arranged that the changeover of stroke construction processing is made based upon the style of type.

The foregoing embodiment illustrates an example in which the character generating program is executed upon being loaded in the RAM 103 However, an arrangement may be adopted in which this program and the related data are first installed in the hard disk 109, with the program then being loaded from the hard disk 109 to the RAM 103 when the program is to be run.

Further, the medium for recording the program is not limited to a floppy disk and may be a CD-ROM, and IC memory card, etc. Furthermore, an arrangement can be adopted in which the program is stored in the ROM 102 in advance and made part of a memory map. The program can then be executed directly by the CPU 101.

Figure 15:
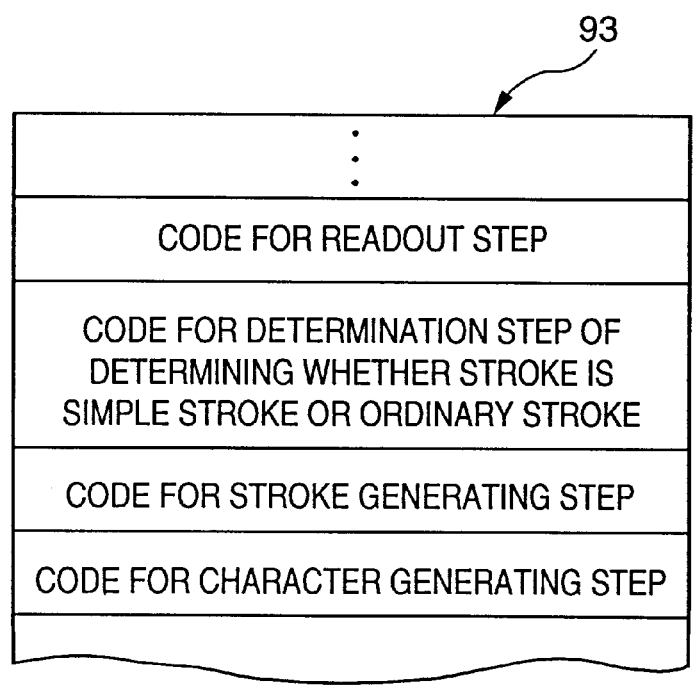
FIG. 15 is a diagram showing the structure of a program file for character pattern generation on a medium such as a floppy disk or CD-ROM on which the program according to the first embodiment has been recorded.

FIG. 15 is a diagram showing the modular structure of a file for execution of the character pattern generating program illustrated in FIG. 13. Included are at least a module of a code for a readout step of reading out stroke data constituting a character using data obtained by storing, in a vector format, each stroke of the character as a combination of a stroke body and a local contour, a module of a code for a determination step of determining whether the stroke that has been read out has a predetermined shape, a module of a code for a stroke generating step of generating a stroke by connecting the local contour and the stroke body by a procedure of maximum speed conforming to the shape determined, and a module of a code for a character generating step of generating a character image by combining strokes generated at the stroke generating step.

[Second Embodiment]

Figure 16:
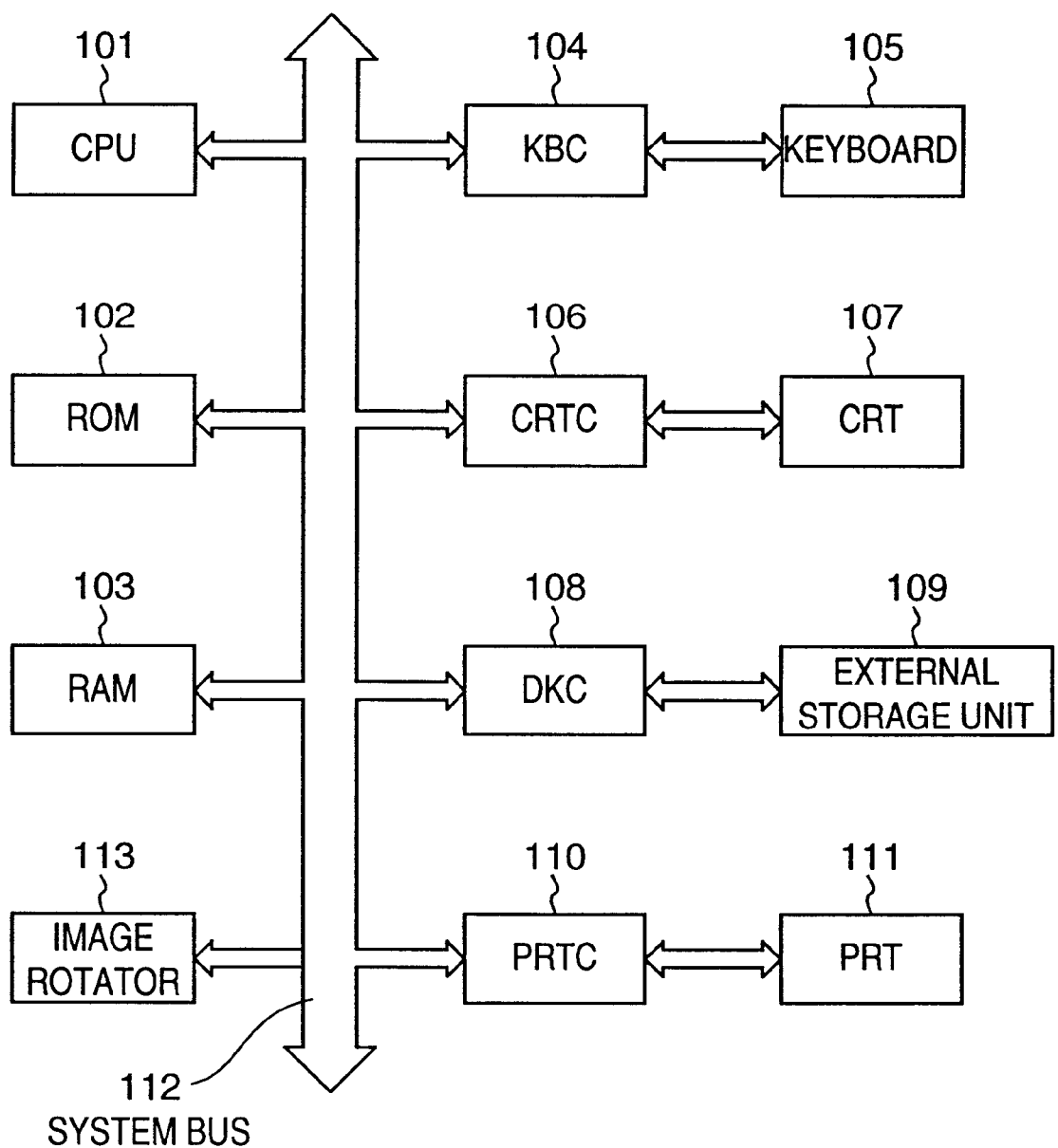
FIG. 16 is a block diagram illustrating the configuration of a system according to the second and third embodiment of the present invention.

FIG. 16 is a block diagram illustrating the basic configuration of a system according to the present invention. This system may be a work station or a computer system. In FIG. 16, the CPU 1 performs overall control of the system and executes processing, etc. The ROM 102 is a storage area for storing a system start-up program, character pattern data, etc. The RAM 103 is a data storage area for unrestricted use. Various programs and data are loaded here depending upon the type of processing so that the programs can be executed. The keyboard controller 104 accepts data entered by pressing keys on the keyboard 105 and sends the data to the CPU 101. The display controller 106 sends the data to the display unit 107, whereby the data is displayed. The external storage unit 109 is a floppy disk device or a hard disk device. Programs and data are stored in the external storage unit 109 in advance and are referred to or loaded as necessary at the time of program execution. The disk controller 108 controls the transmission of data. The printer controller 110 controls the operation of the printer 111. The system bus 112 provides a path or data flowing among the components mentioned above. An image rotator 113 rotates a bitmap image.

The operation for character pattern generation by the system of this embodiment constructed as set forth above is indicated by the flow chart of FIG. 6 of the first embodiment.

FIG. 17B is a diagram illustrating the structure of stroke combination information. STROKE_COUNT indicates the number of strokes that make up a font, STROKE_ST and STROKE_END represent placement coordinates of both end points of the skeleton of a stroke in the font design coordinate system (800×800 in this embodiment of the invention), and STROKE_Weight represents the width information of the stroke. By retrieving stroke data from stroke ID, the size D_STROKE_SIZE, weight information D_STROKE_Weight and control point data D_STROKE_POINT[ ] of each stroke in the stroke design coordinate system are read out.

Figure 18:
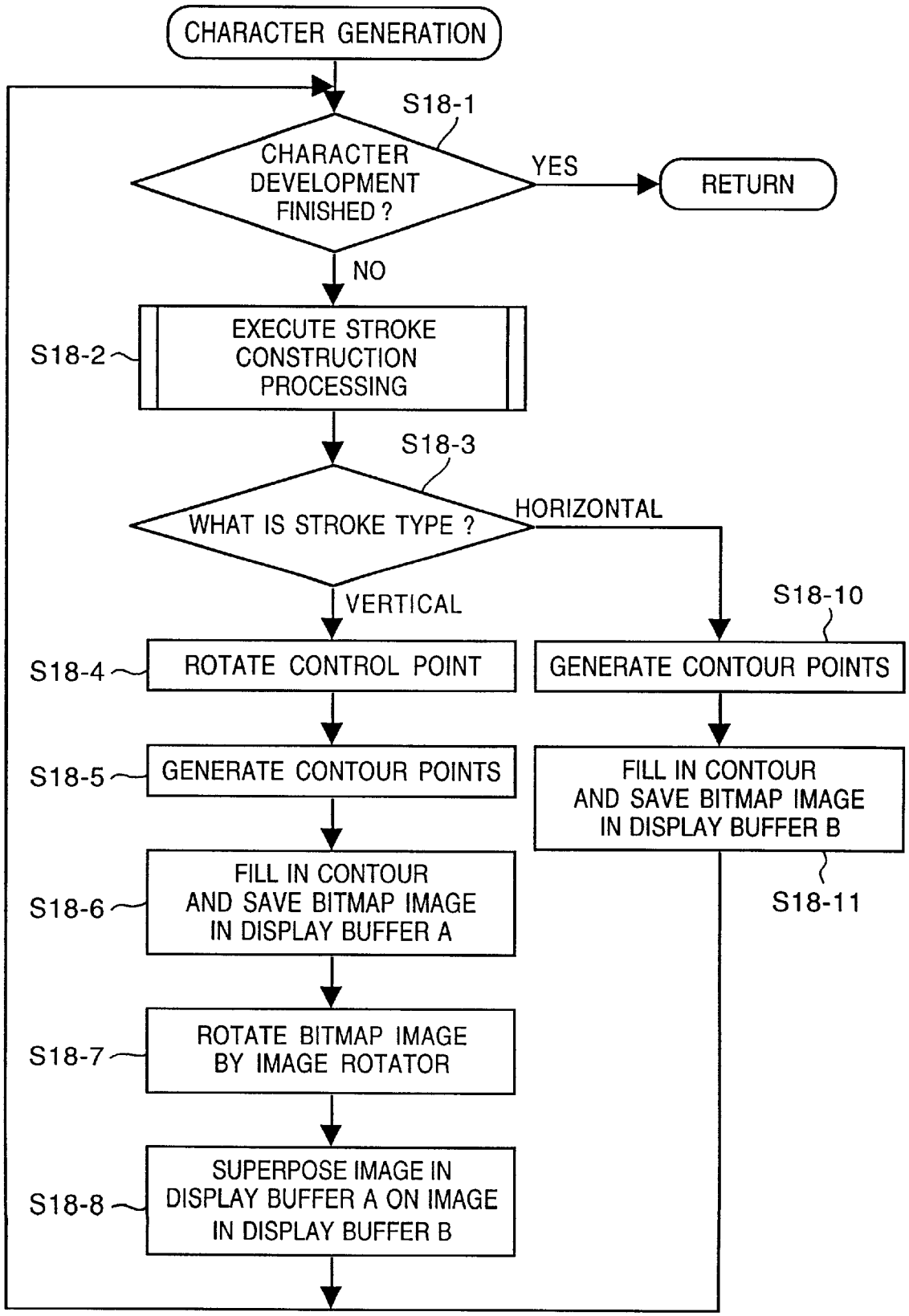
FIG. 18 is a flowchart illustrating character generation processing in the system of the second embodiment.
Figure 20:
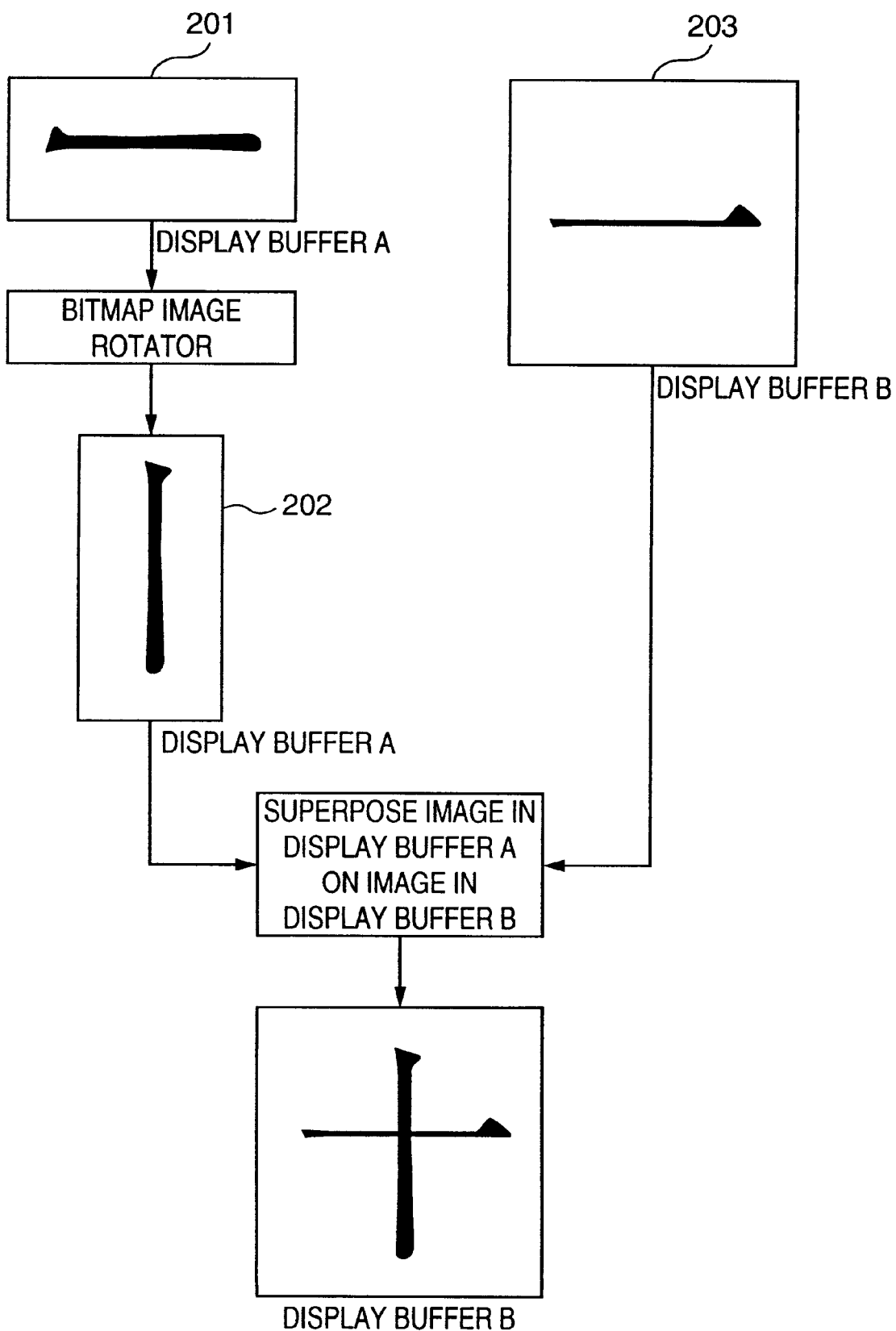
FIG. 20 is a diagram showing the concept of character generation according to the second embodiment.

FIG. 18 is a flowchart illustrating the character generating processing of step S6-4 in FIG. 6 according to this embodiment, and FIG. 20 is a conceptual view showing the procedure of character generating processing. According to this embodiment, the bitmap image of a vertically extending stroke, namely a stroke whose longitudinal direction is perpendicular to the main-scan direction when the image is output by the output unit, is generated as a horizontal stroke whose longitudinal direction lies parallel to the main-scan direction. This horizontal stroke is then subjected to a rotational transformation to generate the original vertically extending stroke and construct the character. In the example of FIG. 20, the image of the vertical line of the character "+" is generated as a horizontally extending line that is the result of 90° of rotation, the generated stroke is rotated by 90° by the image rotator 113 to restore the original vertical line, and this line is finally combined with a separately generated horizontal line to generate the character "+".

In FIG. 18. a judgment as to whether character generation is finished is rendered at step S18-1 by comparing the number of strokes whose generation has been completed with the number of strokes STROKE_COUNT included in the character to be generated. If development of all strokes is not yet finished, the program proceeds to step S18-2. If all strokes have been developed, on the other hand, the program returns to FIG. 6, specifically to step S6-5.

Figure 19:
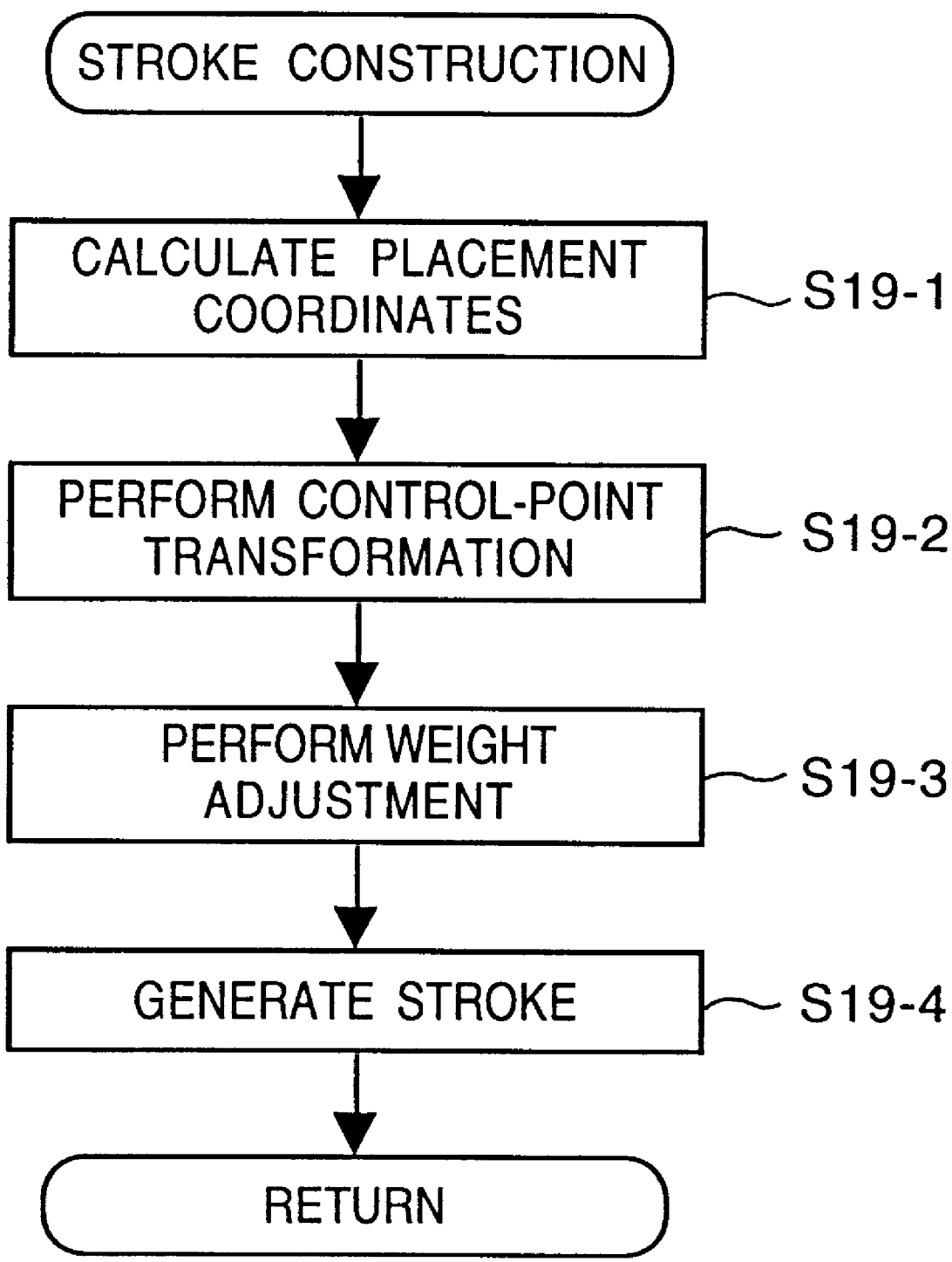
FIG. 19 is a flowchart illustrating the procedure of stroke construction processing in the second and third embodiments.

Stroke construction processing is executed at step S18-2. The details of this step are shown in the flowchart of FIG. 19.

At step S19-1 in FIG. 19, placement coordinates are calculated and the stroke placement coordinates O_STROKE_ST, O_STROKE_EN in the character output coordinate system are obtained in the following manner $$O\_STROKE\_ST = STROKE\_ST \times (OUT\_SIZE/800)$$

$$O\_STROKE\_EN = STROKE\_EN \times (OUT\_SIZE/800)$$

It should be noted that the size of the character in the character output coordinate system is assumed to be (OUT_SIZE×OUT_SIZE).

Step S19-2 is processing for coordinate transformation of the control point data. The ratio for scaling is obtained in accordance with the equation $$Stroke\_Ratio = abs(O\_STROKE\_ST - O\_STROKE\_EN)/abs(D\_STROKE\_ST - D\_STROKE\_EN)$$

The control point D_STROKE_POINT[ ] of the stroke is transformed by $$Stroke\_Ratio \times D\_STROKE\_POINT[\ ]$$

and the value obtained is set as O_STROKE_POINT[ ]. It should be noted that the function abs (x) outputs the absolute value of x.

Step S19-3 is processing for adjusting stroke weight. Specifically, if we let O_Weight represent the weight of the character output coordinate system, a weight conversion ratio is obtained in accordance with the equation $$Weight\_Ratio = O\_Weight/D\_STROKE\_Weight$$

and the control point sequence O_STROKE_POINT[ ] is subjected to a weight adjustment using this ratio in such a manner that the stroke weight will become O_Weight.

Step S19-4 is processing for generating a character by combining strokes. The contour of a stroke is generated by connecting the control point sequence of a local contour (stroke head or stroke tail) to the control point sequence forming the stroke body.

If a stroke is thus constructed, the program proceeds to step S18-3 in FIG. 18.

Step S18-3 is processing for judging stroke type. Here it is determined whether a stroke of interest is a vertically extending stroke or a horizontally extending stroke using the starting point (O_STROKE_ST) and end point (O_STROKE_EN) of the stroke. The program proceeds to step S18-4 in case of a vertically extending stroke and to step S18-10 in case of a horizontally extending stroke.

Contour points of a horizontally extending stroke are generated at step S18-10. Next, at step S18-11, the interior of the contour is filled in using the generated contour points and a bitmap image is saved in a display buffer B. An example of an image generated here is indicated at 203 in FIG. 20.

Step S18-4, on the other hand, is processing for rotating a control point which stipulates the contour of the stroke. The control point of the stroke is subjected to processing for 90° of rotation. Stroke contour points are generated at step S18-5 using the control point. Next, at step S18-6, the interior of the contour is filled in using the generated contour points and a bitmap image is saved in a display buffer A. An example of an image generated here is indicated at 201 in FIG. 20. It should be noted that the longitudinal direction of the stroke of image 201 is a direction in which memory addresses succeed one another in the display buffer A. That is, when the image 201 is generated, the continuous black segment is long and therefore the segment often is written to locations having successive addresses so that image generation can be performed in rapid fashion.

Next, at step S18-7, the bitmap image of the generated stroke is rotated by the bitmap image rotator 113, which is composed of hardware. An example of the image obtained is shown at 202 in FIG. 20. This is followed by step S18-8, at which the rotated bitmap image is superposed on the character generating display buffer B by OR processing.

Thus, vertically extending strokes are generated one after another and superposed on the display buffer B to construct one character image. The image generated is subjected to character data output processing at step S6-5, whereby the prescribed character output is performed by the CRT 106 or printer 110.

The above-described flowchart does not specifically deal with a stroke that is neither simply vertical or horizontal. However, it will suffice to generate such a stroke without executing rotation processing, i.e. to generate the stroke as a horizontally extending stroke. To this end, the attribute of the stroke data is judged at the stroke type judgment step S18-3 without comparing the two end points of the stroke. It will suffice if the attribute is information stored in advance as stroke data, namely data indicating the shape of the stroke as being vertical, horizontal or some other shape.

In accordance with this embodiment, as described above, a vertical stroke is converted to a horizontal stroke extending in the direction of the raster lines, and the horizontal stroke is then rasterized to generate a bitmap image. The raster-line direction usually is the same as the direction of physically successive memory locations. In this case a vertically extending image, namely an image whose longitudinal direction is perpendicular to the direction of the raster lines, is such that a large number (which corresponds to the number of pixels in the longitudinal direction) of comparatively short clusters of black pixels (which correspond to the number of pixels in the transverse direction) are stored at disconnected memory locations. However, in the case of a horizontally extending image, namely an image whose longitudinal direction is parallel to the direction of the raster lines, a small number (which corresponds to the number of pixels in the transverse direction) of comparatively long successive clusters (which correspond to the number of pixels in the longitudinal direction) are stored. Accordingly, since an image can be developed collectively in successive memory locations with regard to a horizontally extending stroke, processing for filling in the interior of the image contour can be executed at high speed and it becomes possible to generate characters at high speed.

[Third Embodiment]

A third embodiment of the invention will now be described.

Character generating processing described here is for a case the display buffer A in the second embodiment can be assured to have a size the same as the that of the display buffer B. In this embodiment, therefore, character generation is performed through the procedure of FIG. 21 instead of that of FIG. 18 of the second embodiment, this procedure being the details of step S6-4 of FIG. 6.

Figure 21:
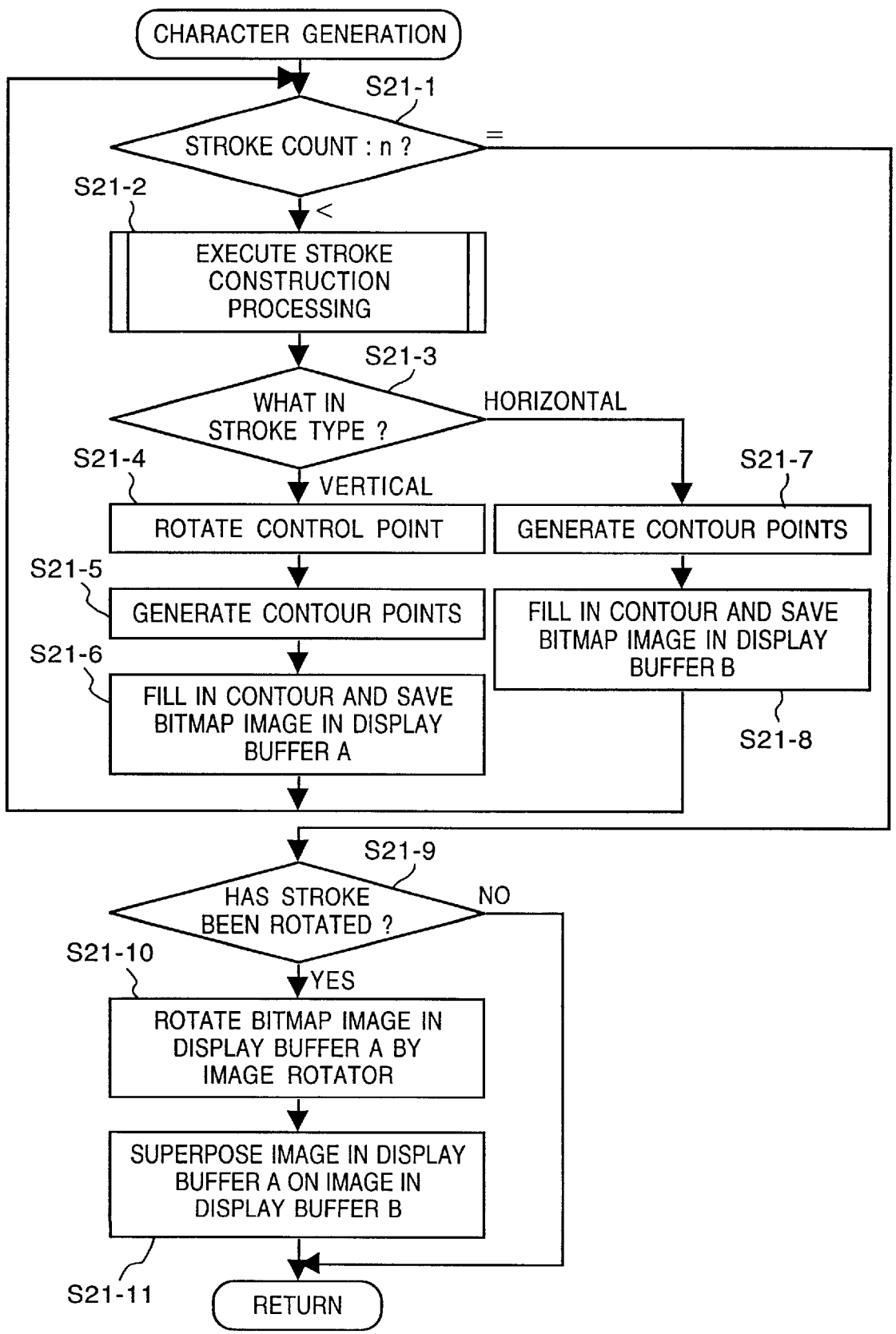
FIG. 21 is a flowchart illustrating character generation processing in the system of the third embodiment.
Figure 22:
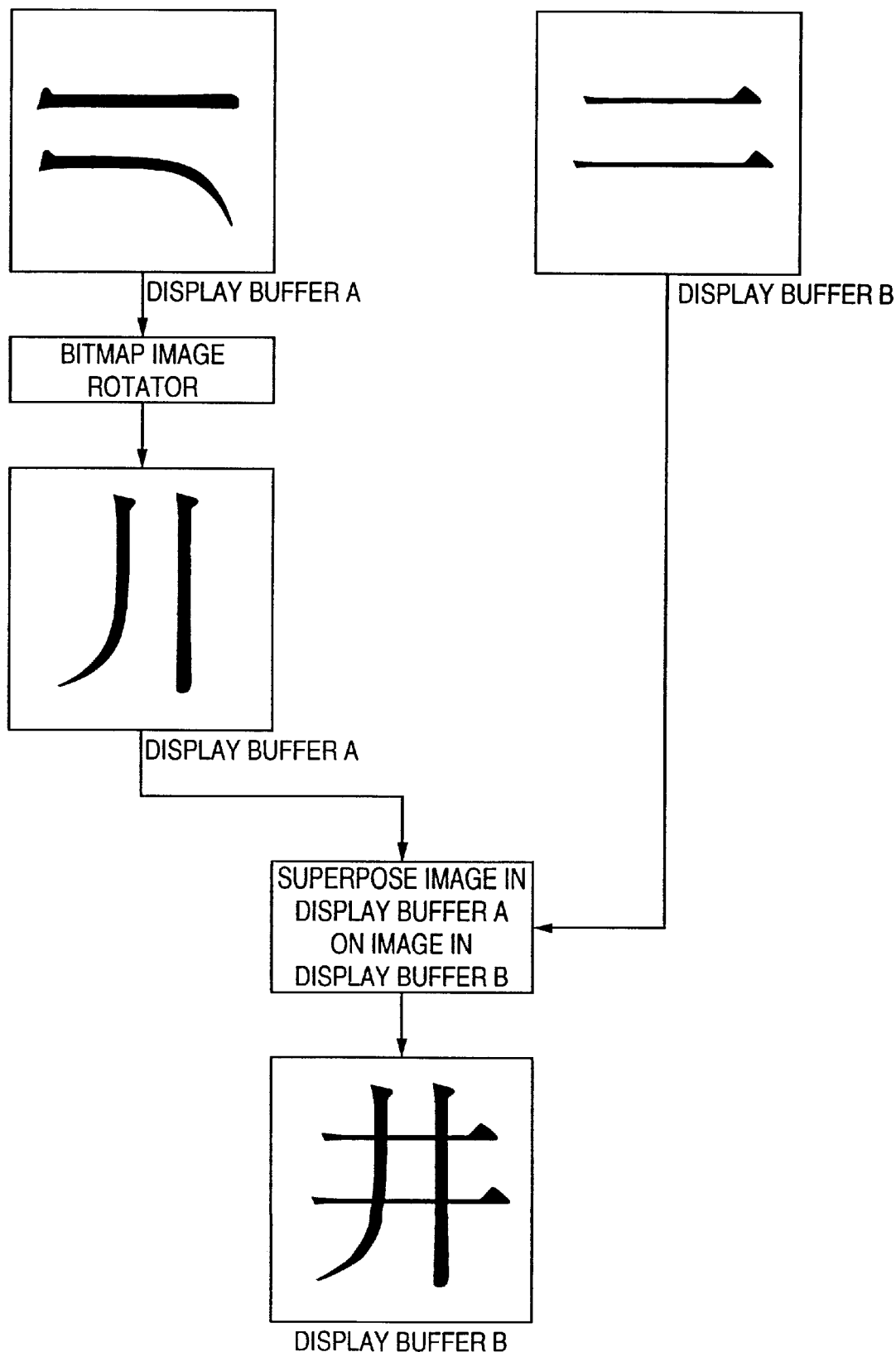
FIG. 22 is a diagram showing the concept of character generation according to the third embodiment.

FIG. 21 is a flowchart showing the details of character generating processing executed at step S6-4 in FIG. 6. FIG. 22 is a conceptual view showing the actions of character generating processing according to this embodiment.

Step S21-1 includes determining whether development of the character is finished and comparing the number of strokes whose development has been completed with the number of strokes STROKE_COUNT included in the character being developed. If development of all strokes is not yet finished, the program proceeds to step S21-2. If all strokes have been developed, on the other hand, the program returns to step S6-5 in FIG. 6.

Stroke construction processing is executed at step S21-2. The details of this step are the same as those of step S18-2 in the second embodiment.

Step S21-3 is processing for judging stroke type. Here it is determined whether a stroke of interest is a vertically extending stroke or a horizontally extending stroke using the starting point (O_STROKE_ST) and end point (O_STROKE_EN) of the stroke. The program proceeds to step S21-4 in case of a vertically extending stroke and to step S21-7 in case of a horizontally extending stroke. Step S21-4 is processing for rotating a control point. The control point of the stroke is subjected to processing for 90° of rotation. Stroke contour points are generated at step S21-5 using the control point. Next, at step S21-6, the interior of the contour is filled in using the generated contour points and a bitmap image is saved in the display buffer A.

By repeating steps S21-2 through S21-6, only original vertical strokes are generated at dispositions corresponding to the dispositions in the character upon rotation of these strokes by 90°.

Contour points of a horizontally extending stroke are generated at step S21-7. Next, at step S21-8, the interior of the contour is filled in using the generated contour points and a bitmap image is saved in the display buffer B.

If it is determined at step S21-1 that the generation of all strokes is finished, the program proceeds to step S21-9. Here it is determined whether processing for stroke rotation has been carried out. If rotation has been carried out, the program proceeds to step S21-10. Here the bitmap image in the display buffer A is rotated using the rotator. This is followed by step S21-11, at which the bitmap image in the buffer A rotated at step S21-10 is superposed on the character generating display buffer B by OR processing.

In this system the image generated is subjected to character data output processing at step S6-5, whereby the prescribed character output is performed by the CRT 106 or printer 110.

Thus, as described above, vertical strokes included in one character are rasterized collectively as horizontal strikes and then rotated by 90°. The rotated strokes are then superposed on the original horizontal strokes to form the character.

In accordance with this embodiment, as described above, use is made of the buffer A for vertical strokes and the buffer B for horizontal strokes and strokes constituting a character are painted in either of the buffers. After all strokes are generated, the vertical-stroke buffer A is rotated by the rotator and superposed on the horizontal-stroke buffer B, thereby making it possible to generate the character at high speed. This embodiment provides the second embodiment with an additional advantage. Specifically, when strokes that have been rotated by 90° are returned to their original orientation, this is performed collectively, thereby raising the speed of processing correspondingly.

It should be noted that it is possible to switch between processing in such a manner that the processing of the second embodiment is used to generate a character when the number of vertical strokes among the strokes constituting the character is small in number and the processing of the third embodiment is used to generate a character when the number of vertical strokes among the strokes constituting the character is large. Further, it is possible to change over the procedure of character generation in such a manner that the second embodiment is used if the available memory is small and the buffer sizes are such that A<B holds and the third embodiment is used if the buffer sizes are such that A≧B holds.

Furthermore, character images can be generated at even higher speed if the processing of the third embodiment is used in conjunction with the processing of the first embodiment, in which strokes are generated depending upon whether the shape of a stroke is simple or not.

The present invention can be applied to a system constituted by a plurality of devices (e.g., a host computer, interface, reader, printer, etc.) or to an apparatus comprising a single device (e.g., a copier or facsimile machine, etc.).

Further, it goes without saying that the object of the present invention can also be achieved by providing a storage medium storing the program codes of the software for performing the aforesaid functions of the foregoing embodiments to a system or an apparatus, reading the program codes with a computer (e.g., a CPU or MPU) of the system or apparatus from the storage medium, and then executing the program.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, the present invention covers a case where an operating system (OS) or the like working on the computer performs a part of or the entire process in accordance with the designation of program codes and implements the functions according to the embodiment.

Furthermore, the present invention further covers a case where, after the program codes read from the storage medium are written in a function extension board inserted into the computer or in a memory provided in a function extension unit connected to the computer, a CPU or the like contained in the function extension board or function extension unit performs a part of or the entire process in accordance with the designation of program codes and implements the function of the above embodiments.

Figure 23:
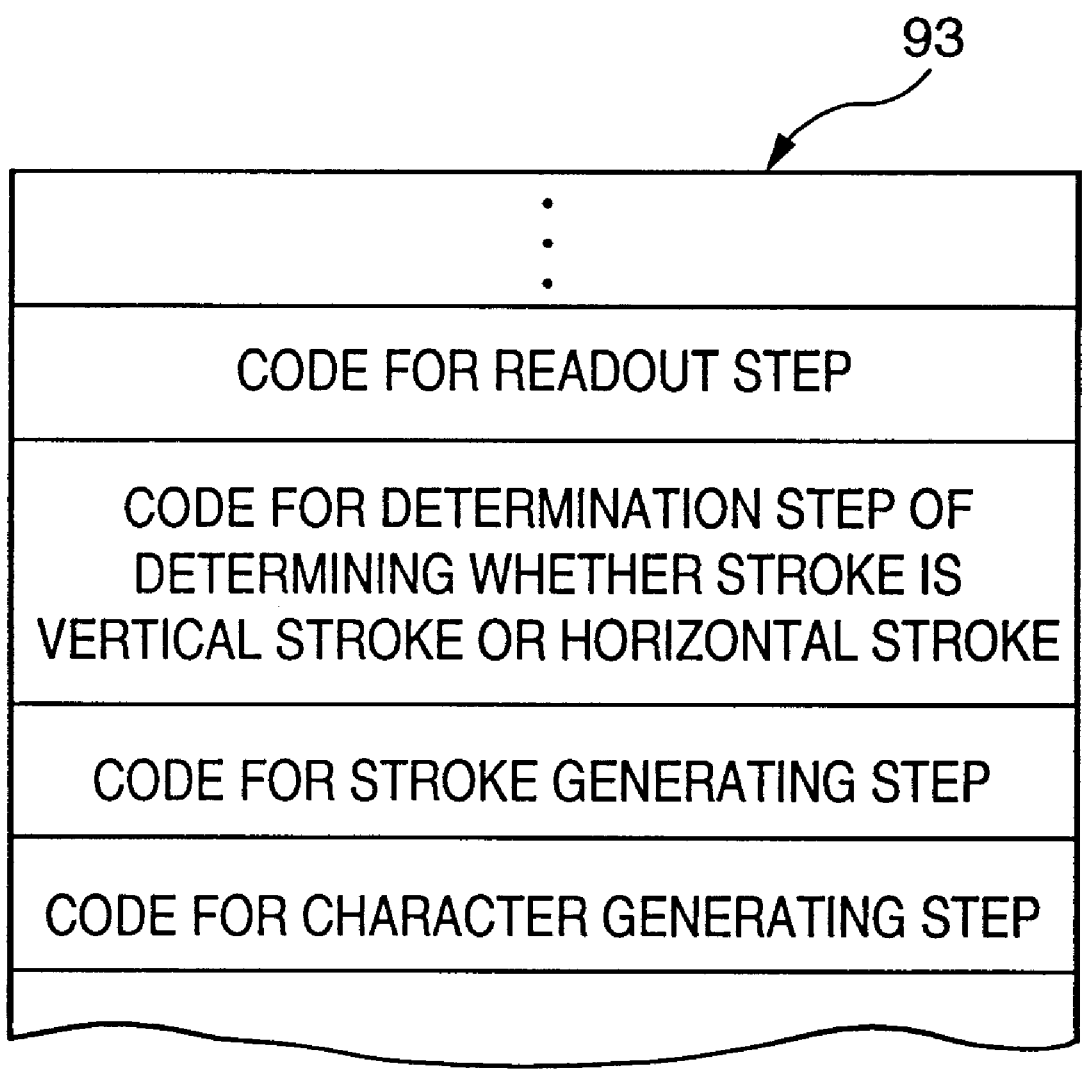
FIG. 23 is a diagram showing the structure of a program file for character pattern generation on a medium such as a floppy disk or CD-ROM on which the program according to the second and third embodiments has been recorded.

In a case where the present invention is applied to the above-mentioned storage medium, program codes corresponding to the flowcharts set forth above are stored on the storage medium. More specifically, modules illustrating examples of the memory maps of FIGS. 15 and 23 are stored on the storage medium. The arrangement of FIG. 15 is as set forth above. As for FIG. 23, the memory map includes a code for a readout step of reading out stroke data constituting a character using data obtained by storing, in a vector format, each stroke of the character as a combination of a stroke body and a local contour, a code for a determination step of determining whether the stroke is vertical or horizontal based upon the stroke data stroke data that has been read out, a code for a stroke generating step of generating a bitmap image by converting a stroke, which has been determined to be vertical, to a horizontal stroke and leaving a stroke determined to be horizontal as is, and restoring to the original the bitmap image of a stroke that has been converted to a horizontal stroke, and a code for a character generating step of generating a character image by combining strokes generated at the stroke generating step.

As described above, the character generating method and apparatus of the present invention make it possible to greatly simplify stroke construction processing and to generate strokes at high speed by changing over stroke construction processing depending upon the shape of the stroke.

Further, character generating speed can be raised even further by producing the image after converting strokes in such a manner that pixels of a row of successive pixels extending longitudinally of an elongated stroke are developed at successive memory locations.

As many apparently widely different embodiments of the present invention can be made without departing from the spirit and scope thereof, it is to be understood that the invention is not limited to the specific embodiments thereof except as defined in the appended claims.

What is claimed is:

1. A character generating apparatus for generating a character image from stroke images, comprising:

a determiner for determining whether or not a stroke of interest is a horizontally extending stroke;

a first stroke image generator that, in a case where it is determined that the stroke of interest is a horizontally extending stroke, generates a stroke contour point using a control point which defines a contour of the stroke, generates a stroke image by filling the interior of the stroke in a horizontal direction on the basis of the stroke contour point and stores the stroke image in a first buffer;

a second stroke image generator that, in a case where it is determined that the stroke of interest is not a horizontally extending stroke, rotates a control point which defines a contour of the stroke, generates a stroke contour point using the rotated control point, generates a stroke image by filling the interior of the stroke in the horizontal direction on the basis of the stroke contour point and stores the stroke image in a second buffer; and a third generator, that rotates the stroke image saved in the second buffer and stores the rotated stroke image in the stroke image in the first buffer.

2. An apparatus according to claim 1, wherein said third generator rotates the stroke image by means of hardware.

3. An apparatus according to claim 1, wherein said determiner determines whether or not a stroke of interest is a horizontally extending stroke using an attribute of the stroke.

4. An apparatus according to claim 1, wherein, in a case where the first buffer can be assured to have a size which is the same as a size of the second buffer, processing by said third generator is performed after completing processing by said second stroke image generator for a character.

5. An apparatus according to claim 1, further comprising an output device for outputting a character based on a character image generated from stroke images stored in the first buffer.

6. An apparatus according to claim 1, wherein said output device includes a printer.

7. A character generating method for generating a character image from stroke images, comprising the steps of:

(a) determining whether or not a stroke of interest is a horizontally extending stroke;

(b) in a case where it is determined that the stroke of interest is a horizontally extending stroke, generating a stroke contour point using a control point which defines a contour of the stroke, generating a stroke image by filling the interior of the stroke in a horizontal direction on the basis of the stroke contour point and storing the stroke image in a first buffer;

(c) in a case where it is determined that the stroke of interest is not a horizontally extending stroke, rotating a control point which defines a contour of the stroke, generating a stroke contour point using the rotated control point, generating a stroke image by filling the interior of the stroke in the horizontal direction on the basis of the stroke contour point and storing the stroke image in a second buffer; and (d) rotating the stroke image saved in the second buffer and storing the rotated stroke image on the stroke image in the first buffer.

8. A method according to claim 7, wherein the stroke image is rotated in step (d) by means of hardware.

9. A method according to claim 7, wherein it is determined whether or not a stroke of interest is a horizontally extending stroke using an attribute of the stroke in step (a).

10. A method according to claim 7, wherein, in a case where the first buffer can be assured to have a size which is the same as a size of the second buffer, processing in said step (c) is performed after completing processing in step (b) for a character.

11. A method according to claim 7, further comprising the step of outputting a character based on a character image generated from stroke images stored in the first buffer.

12. A method according to claim 7, wherein the character is output by a printer in said outputting step.

13. A computer-readable memory medium storing instructions for causing a computer to execute a character generating method for generating a character image from stroke images, said method comprising the steps of:

(a) determining whether or not a stroke of interest is a horizontally extending stroke;

(b) in a case where it is determined that the stroke of interest is a horizontally extending stroke, generating a stroke contour point using a control point which defines a contour of the stroke, generating a stroke image by filling the interior of the stroke in a horizontal direction on the basis of the stroke contour point and storing the stroke image in a first buffer;

(c) in a case where it is determined that the stroke of interest is not a horizontally extending stroke, rotating a control point which defines a contour of the stroke, generating a stroke contour point using the rotated control point, generating a stroke image by filling the interior of the stroke in the horizontal direction on the basis of the stroke contour point and storing the stroke image in second buffer; and (d) rotating the stroke image saved in the second buffer and storing the rotated stroke image on the stroke image in the first buffer.

14. A memory medium according to claim 13, wherein the stroke image is rotated in step (d) by means of hardware.

15. A memory medium according to claim 13, wherein it is determined whether or not a stroke of interest is a horizontally extending stroke using an attribute of the stroke in step (a).

16. A memory medium according to claim 13, wherein, in a case where the first buffer can be assured to have a size which is the same as a size of the second buffer, processing in said step (c) is performed after completing processing in step (b) for a character.

17. A memory medium according to claim 13, further comprising the step of outputting a character based on a character image generated from stroke images stored in the first buffer.

18. A memory medium according to claim 13, wherein the character is output by a printer in said outputting step.

19. A program product for causing a computer to execute a character generating method for generating a character image from stroke images, said method comprising the steps of:

(a) determining whether or not a stroke of interest is a horizontally extending stroke;

(b) in a case where it is determined that the stroke of interest is a horizontally extending stroke, generating a stroke contour point using a control point which defines a contour of the stroke, generating a stroke image by filling the interior of the stroke in a horizontal direction on the basis of the stroke contour point and storing the stroke image in a first buffer;

(c) in a case where it is determined that the stroke of interest is not a horizontally extending stroke, rotating a control point which defines a contour of the stroke, generating a stroke contour point using the rotated control point, generating a stroke image by filling the interior of the stroke in the horizontal direction on the basis of the stroke contour point and storing the stroke image in second buffer; and (d) rotating the stroke image saved in the second buffer and storing the rotated stroke image on the stroke image in the first buffer.

20. A program product according to claim 19, wherein the stroke image is rotated in step (d) by means of hardware.

21. A program product according to claim 19, wherein it is determined whether or not a stroke of interest is a horizontally extending stroke using an attribute of the stroke in step (a).

22. A program product according to claim 19, wherein, in a case where the first buffer can be assured to have a size which is the same as a size of the second buffer, processing in said step (c) is performed after completing processing in step (b) for a character.

23. A program product according to claim 19, further comprising the step of outputting a character based on a character image generated from stroke images stored in the first buffer.

24. A program product according to claim 19, wherein the character is output by a printer in said outputting step.

25. An apparatus according to claim 1, wherein the control point is rotated 90 degrees by said second stroke image generator and the stroke image is generated in each of the first and the second buffers so that the horizontal direction corresponds with a direction of physically successive memory locations of each of the first and the second buffers.

26. A character generating apparatus for generating a character image from stroke images, comprising:

a determiner for determining whether or not the longitudinal direction of a stroke of interest corresponds with a direction of a raster line of a stroke image to be generated in a memory;

a first stroke image generator that, in a case where it is determined that the longitudinal direction of the stroke of interest corresponds with the direction of the raster line, generates a stroke contour point using a control point which defines a contour of a stroke, and generates a stroke image in a first area of the memory by rasterizing the stroke of interest on the basis of the stroke contour point;

a second stroke image generator that, in a case where it is determined that the longitudinal direction of the stroke of interest does not correspond with the direction of the raster line, generates a stroke contour point using a control point which defines a contour of a stroke, rotates a control point which defines a contour of the stroke by 90 degrees, generates a stroke contour point using the rotated control point, and generates a stroke image in a second area of the memory by rasterizing the stroke on the basis of the stroke contour point; and a third generator, that rotates the stroke image generated in the second area of the memory and stores the rotated stroke image in the stroke image in the first area of the memory, wherein the direction of the raster line corresponds with a direction of physically successive memory locations of the memory.

27. A character generating apparatus for generating a stroke by connecting a stroke head, a stroke body, and a stroke tail and for generating a character by combining strokes, the character generating apparatus comprising:

a determiner for determining whether or not a stroke body of interest is horizontal or vertical;

a connector for, in a case that the stroke body is not horizontal or vertical, calculating an angle defined by a vector connecting both end points of an end portion of a stroke head or a stroke tail and a vector connecting both end points of an end portion of the stroke body by using an inner product of the vectors, rotating the stroke head or the stroke tail in accordance with the calculated angle, and connecting the stroke body and the rotated stroke head or the rotated stroke tail, and in a case that the stroke body is horizontal or vertical, rotating the stroke head or the stroke tail by a predetermined angle, and connecting the stroke body and the rotated stroke head or the rotated stroke tail.

28. A method for generating a stroke by connecting a stroke head, a stroke body, and a stroke tail and for generating a character by combining strokes, said method comprising the steps of:

determining whether or not a stroke body of interest is horizontal or vertical;

in a case that the stroke body is not horizontal or vertical, calculating an angle defined by a vector connecting both end points of an end portion of a stroke head or a stroke tail and a vector connecting both end points of an end portion of the stroke body by using an inner product of the vectors, rotating the stroke head or the stroke tail in accordance with the calculated angle, and connecting the stroke body and the rotated stroke head or the rotated stroke tail; and in a case that the stroke body is horizontal or vertical, rotating the stroke head or the stroke tail by a predetermined angle, and connecting the stroke body and the rotated stroke head or the rotated stroke tail.

29. A computer-readable memory medium storing instructions for causing a computer to execute a method for generating a stroke by connecting a stroke head, a stroke body, and a stroke tail and for generating a character by combining strokes, said method comprising the steps of:

determining whether or not a stroke body of interest is horizontal or vertical;

in a case that the stroke body is not horizontal or vertical, calculating an angle defined by a vector connecting both end points of an end portion of a stroke head or a stroke tail and a vector connecting both end points of an end portion of the stroke body by using an inner product of the vectors, rotating the stroke head or the stroke tail in accordance with the calculated angle, and connecting the stroke body and the rotated stroke head or the rotated stroke tail; and in a case that the stroke body is horizontal or vertical, rotating the stroke head or the stroke tail by a predetermined angle, and connecting the stroke body and the rotated stroke head or the rotated stroke tail.

30. A program product for causing a computer to execute a method for generating a stroke by connecting a stroke head, a stroke body, and a stroke tail and for generating a character by combining strokes, said method comprising the steps of:

determining whether or not a stroke body of interest is horizontal or vertical;

in a case that the stroke body is not horizontal or vertical, calculating an angle defined by a vector connecting both end points of an end portion of a stroke head or a stroke tail and a vector connecting both end points of an end portion of the stroke body by using an inner product of the vectors, rotating the stroke head or the stroke tail in accordance with the calculated angle, and connecting the stroke body and the rotated stroke head or the rotated stroke tail; and in a case that the stroke body is horizontal or vertical, rotating the stroke head or the stroke tail by a predetermined angle, and connecting the stroke body and the rotated stroke head or the rotated stroke tail.

* * * * *

UNITED STATES PATENT AND TRADEMARK OFFICE
CERTIFICATE OF CORRECTION

PATENT NO. : 6,201,553 B1
DATED : March 13, 2001
INVENTOR(S) : Hidekazu Morooka

It is certified that error appears in the above-identified patent and that said Letters Patent is hereby corrected as shown below:

Title page,
Item [57] ABSTRACT,
Line 18, "at" should read -- at a --.

Figure 4:
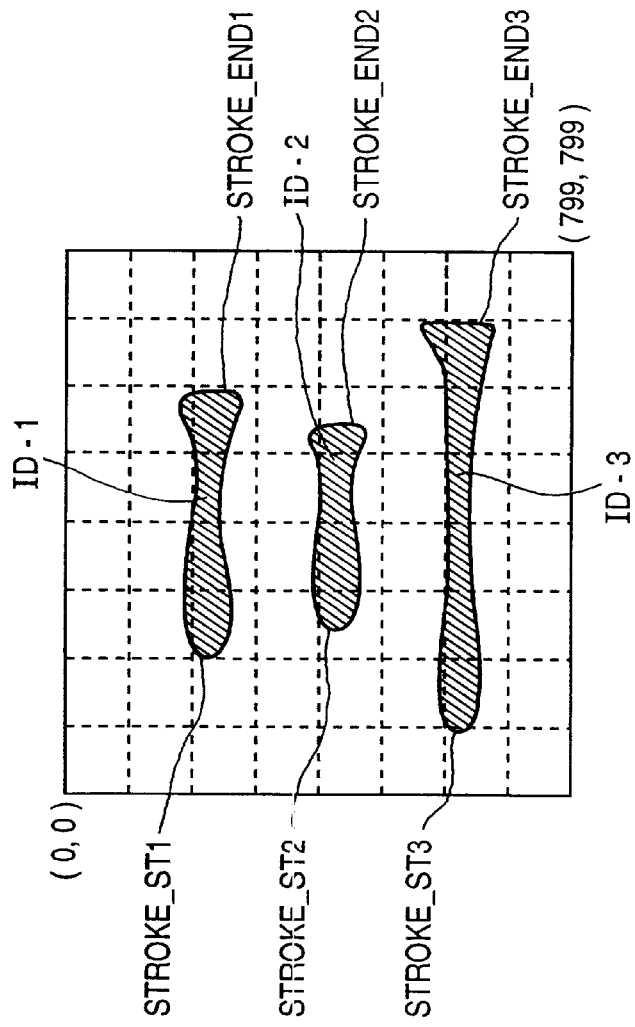
FIG. 4 is a diagram illustrating an example of stroke placement and attribute data.

Column 2,
Line 56, "FIG. 4 is a diagram" should read -- FIGS. 4A and 4B are diagrams --.

Figure 17:
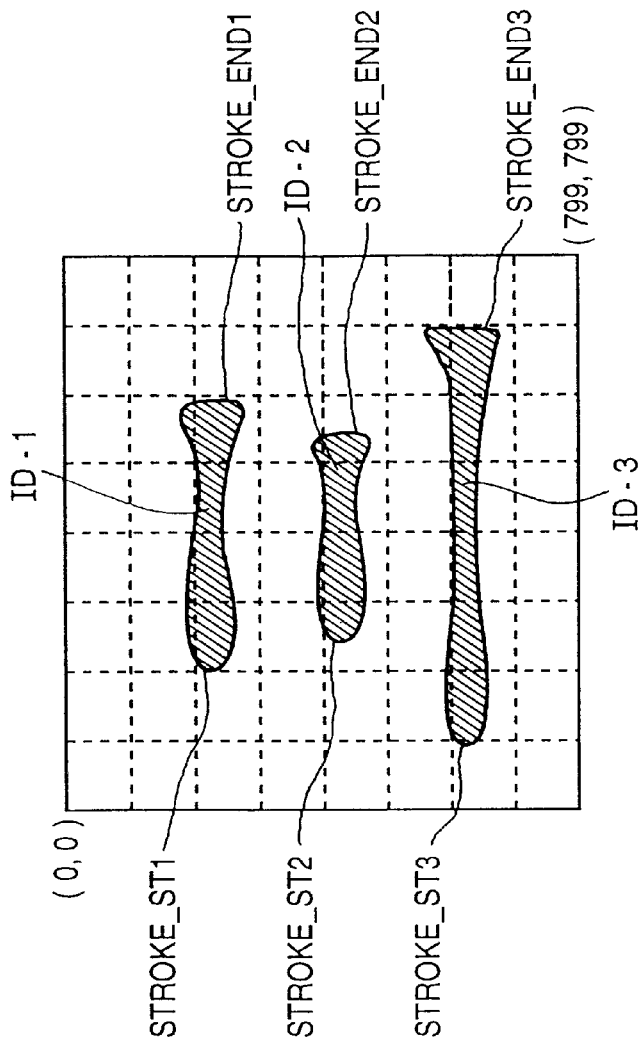
FIG. 17 is a diagram illustrating an example of stroke placement data according to the second and third embodiments.

Column 3,
Line 25, "FIG. 17 is a diagram" should read -- FIGS. 17A and 17B are diagrams --.

Column 10,
Line 51, "103 However," should read -- 103. However, --.

Column 13,
Line 60, "case" should read -- case in --.

Column 17,
Line 54, "in" should read -- in a --.

Column 18,
Line 29, "in" should read -- in a --.

Column 19,
Line 27, "vertical;" should read -- vertical; and --.

Signed and Sealed this

Twenty-sixth Day of February, 2002

Attest:

JAMES E. ROGAN
*Attesting Officer*   *Director of the United States Patent and Trademark Office*